(12) United States Patent
Maekawa et al.

(10) Patent No.: US 9,580,858 B2
(45) Date of Patent: Feb. 28, 2017

(54) MOTOR CONTROL DEVICE, AIR CONDITIONER, WASHING MACHINE AND REFRIGERATOR

(71) Applicant: KABUSHIKI KAISHA TOSHIBA, Minato-ku (JP)

(72) Inventors: Sari Maekawa, Yokohama (JP); Nobuyuki Suzuki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 56 days.

(21) Appl. No.: 14/813,601

(22) Filed: Jul. 30, 2015

(65) Prior Publication Data

US 2016/0036360 A1 Feb. 4, 2016

(30) Foreign Application Priority Data

Jul. 30, 2014 (JP) ................................ 2014-154883

(51) Int. Cl.
  *G05B 11/28* (2006.01)
  *D06F 58/20* (2006.01)
  *H02M 7/5387* (2007.01)

(52) U.S. Cl.
  CPC ........ *D06F 58/206* (2013.01); *H02M 7/53873* (2013.01)

(58) Field of Classification Search
  CPC ............... H02P 27/08; H02M 7/53873; H02M 7/53875; G05B 11/28
  USPC ................................................. 318/599, 811
  See application file for complete search history.

(56) References Cited

U.S. PATENT DOCUMENTS

| 2003/0052641 | A1* | 3/2003 | Yoshimoto | H02P 21/22 318/700 |
| 2007/0145941 | A1* | 6/2007 | Asada | D06F 37/304 318/811 |
| 2008/0042606 | A1* | 2/2008 | Chen | B60L 15/025 318/474 |
| 2010/0090632 | A1* | 4/2010 | Maekawa | H02P 6/18 318/400.33 |
| 2012/0074888 | A1* | 3/2012 | Maekawa | H02P 6/18 318/400.36 |

FOREIGN PATENT DOCUMENTS

JP 3447366 9/2003

* cited by examiner

*Primary Examiner* — Rina Duda
(74) *Attorney, Agent, or Firm* — Oblon, McClelland, Maier & Neustadt, L.L.P.

(57) ABSTRACT

A motor control device driving a motor via an inverter circuit includes a current sensing element, a PWM signal generation unit and a current detection unit. The PWM signal generation unit is configured to generate three-phase PWM signals in a manner such that the current detection unit is capable of detecting two-phase currents at two fixed time-points within a carrier period of the PWM signal. A duty of one of the three-phase PWM signals is increased/decreased to both phase lag side and phase lead side with reference to any phase. A duty of another phase PWM signal is increased/decreased to both phase lag side and phase lead side with reference to any phase away one half of the carrier period from the reference phase. A duty of the other phase PWM signal is increased/decreased to either phase lag side or phase lead side with reference to any phase.

6 Claims, 21 Drawing Sheets

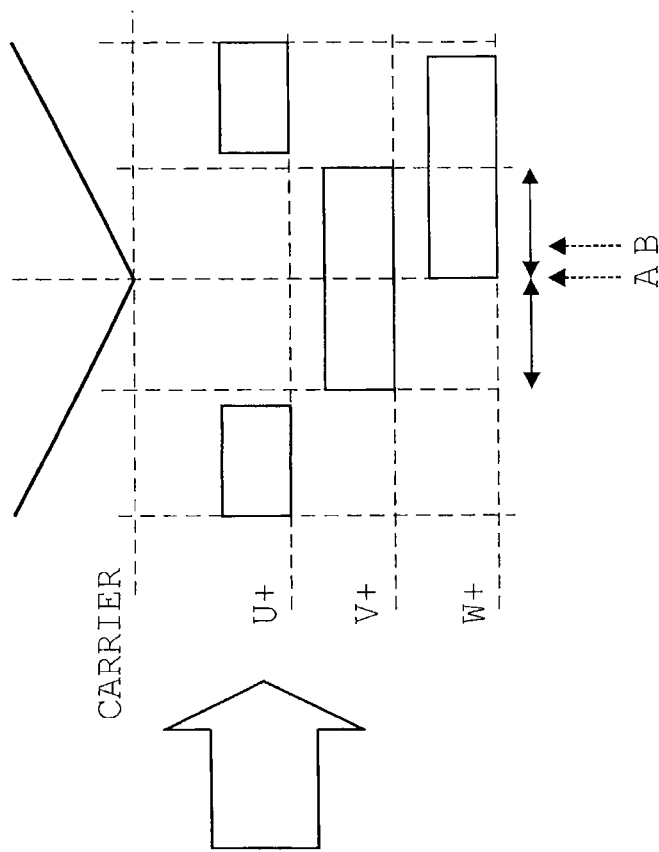
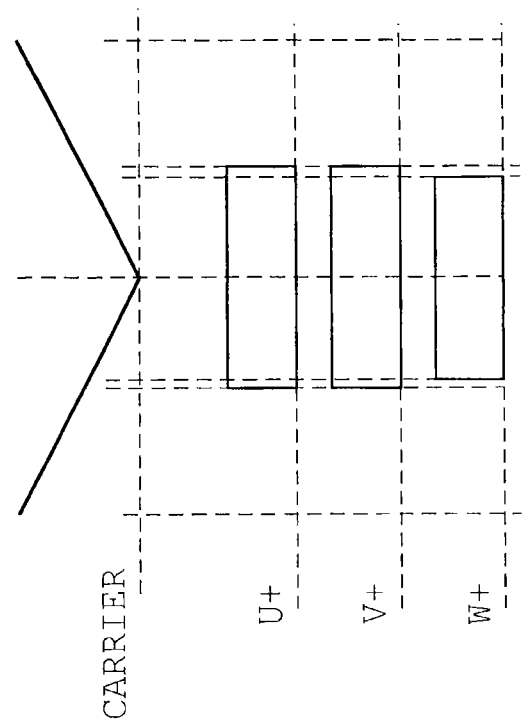
FIG. 7B
FIG. 7A

CONVERSION OF FIRST SECTION SET VALUE

| U-PHASE DUTY' | V-PHASE DUTY' | W-PHASE DUTY' |
|---|---|---|
| CARRIER MAXIMUM VALUE − U-PHASE DUTY (OUTPUT TO H-SIDE WHEN DUTY IS LOWER THAN CARRIER) | V-PHASE DUTY (OUTPUT TO H-SIDE WHEN DUTY IS HIGHER THAN CARRIER) | IF W-PHASE DUTY×2 < CARRIER MAXIMUM VALUE → 2×W-PHASE DUTY OR ELSE → CARRIER MAXIMUM VALUE (OUTPUT TO H-SIDE WHEN DUTY IS HIGHER THAN CARRIER) |

CONVERSION OF SECOND SECTION SET VALUE

| U-PHASE DUTY' | V-PHASE DUTY' | W-PHASE DUTY' |
|---|---|---|
| CARRIER MAXIMUM VALUE − U-PHASE DUTY (OUTPUT TO H-SIDE WHEN DUTY IS LOWER THAN CARRIER) | V-PHASE DUTY (OUTPUT TO H-SIDE WHEN DUTY IS HIGHER THAN CARRIER) | IF W-PHASE DUTY×2 < CARRIER MAXIMUM VALUE → CARRIER MAXIMUM VALUE OR ELSE → 2×CARRIER MAXIMUM VALUE − 2×W-PHASE DUTY (OUTPUT TO H-SIDE WHEN DUTY IS LOWER THAN CARRIER) |

MOTOR CONTROL DEVICE, AIR CONDITIONER, WASHING MACHINE AND REFRIGERATOR

CROSS-REFERENCE TO RELATED APPLICATIONS

This application is based upon and claims the benefit of priority from the prior Japanese Patent Application No. 2014-154883 filed on Jul. 30, 2014, the entire contents of which are incorporated herein by reference.

FIELD

Embodiments described herein relate to a motor control device detecting phase currents by a current sensing element disposed in a direct-current part of an inverter circuit, and an air conditioner, a washing machine and a refrigerator all of which are configured using the motor control device.

BACKGROUND

A technique has conventionally been known that an electric current is detected using a single shunt resistance inserted into a direct-current part of an inverter circuit when U-, V- and W-phase currents are detected for the purpose of controlling an electric motor. In order that all the three-phase currents may be detected in the above-mentioned manner, a three-phase PWM (pulse width modulation) signal pattern needs to be generated in one period of a PWM carrier so that two or more phase currents are detectable. For example, FIG. 21 shows a case where a saw-tooth wave carrier is used. Assume now that U phase duty and V phase duty are equal to each other. In this case, when upper arm switching elements U+ and V+ of the inverter circuit are in an ON state and an upper arm switching element W+ is in an OFF state, a W-phase current can be detected but the other phase currents cannot be detected. In view of this problem, as shown in FIG. 22, it is considered that two-phase or more currents are normally detectable by shifting one phase (the W phase, in this case) of PWM signal, as shown in FIG. 22.

However, when the phases of PWM signal are sequentially shifted, a motor current changes in a stepwise manner in synchronization with transition from a pattern in which the PWM signal of one phase is shifted to another pattern in which the PWM signal of another phase is shifted, as shown in FIG. 23. FIG. 23 also shows parts of waveforms in an enlarged manner. When the U-phase current is increased and decreased alternately repeatedly every carrier period, the U-phase current is decreased twice continuously in synchronization with the aforementioned transition. This results in occurrence of stepwise change as shown in FIG. 23. The current change in this case causes torque variations, resulting in a problem that a level of noise produced during drive of the motor is increased.

BRIEF DESCRIPTION OF THE DRAWINGS

FIGS. 7A and 7B show a case where the centers of three-phase PWM signal pulses correspond to zero level of carrier and a view corresponding to FIG. 3, respectively;

FIG. 15 shows logics of duty conversion carried out by the pulse generator;

DETAILED DESCRIPTION

In general, according to one embodiment, a motor control device is configured to drive an electric motor via an inverter circuit which is configured to on-off control a plurality of switching elements connected into a three-phase bridge configuration, according to a predetermined PWM signal pattern thereby to convert direct current to three-phase alternating currents. The motor control device includes a current sensing element, a PWM signal generation unit and a current detection unit. The current sensing element is connected to the direct current side of the inverter circuit and configured to generate a signal according to a current value. The PWM signal generation unit is configured to determine a rotor position based on phase currents of the motor and to generate a three-phase PWM signal pattern so that the pattern follows the rotor position. The current detection unit is configured to detect phase currents of the motor based on the signal generated by the current sensing element and the PWM signal pattern. The PWM signal generation unit is configured to generate the three-phase PWM signal in a manner such that the current detection unit is capable of detecting two-phase currents at two fixed time-points within a carrier period of the PWM signal. Regarding a first one of the three-phase PWM signals, a duty thereof is increased/ decreased to both phase lag side and phase lead side with reference to any phase in the carrier period. Regarding another phase PWM signal, a duty thereof is increased/decreased to both phase lag side and phase lead side with reference to any phase away one half of the carrier period from the reference phase. Regarding the other phase PWM signal, a duty thereof is increased/decreased to either phase lag side or phase lead side with reference to any phase in the carrier period.

Figure 1:
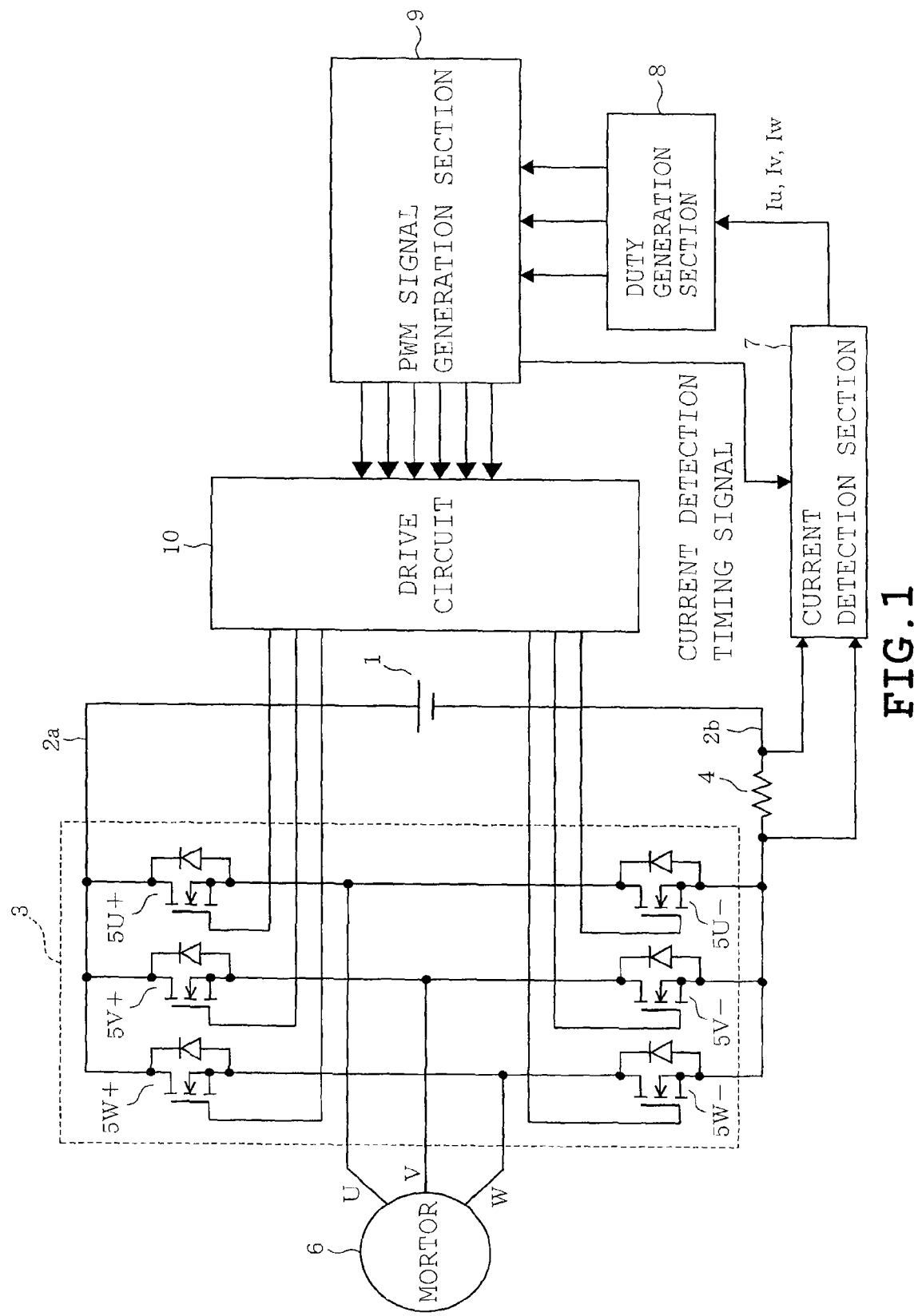
FIG. 1 is a functional block diagram showing an electrical configuration of the motor control device according to a first embodiment.
Figure 2:
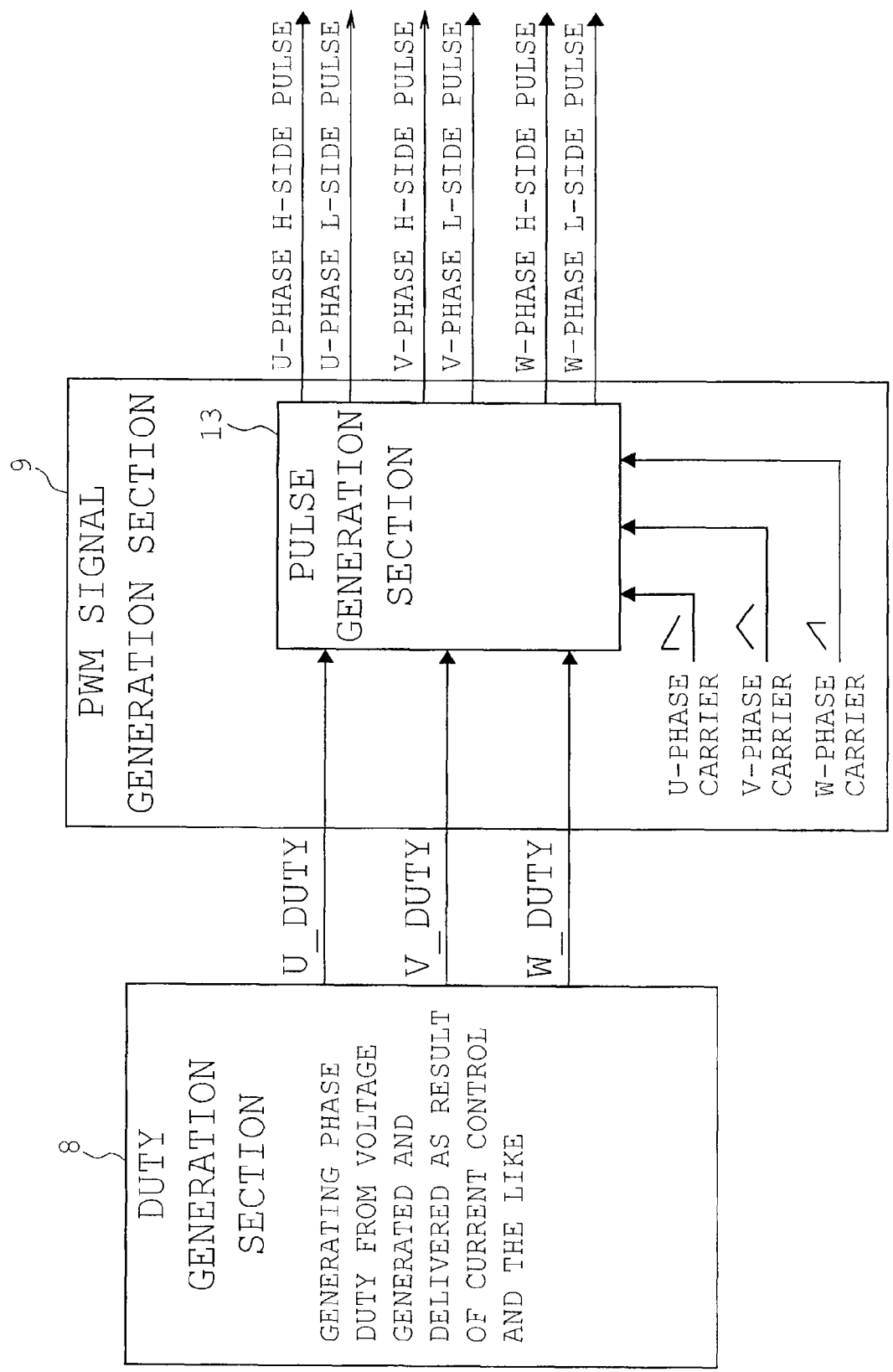
FIG. 2 is a functional block diagram showing an electrical configuration of a PWM signal generation section.

A first embodiment will be described with reference to FIGS. 1 to 11. Although a DC power supply 1 shown in FIG. 1 is designated by a symbol of DC power supply, the DC power supply 1 includes a rectifier circuit, a smoothing capacitor and the like when a DC power supply is generated from a commercial AC power supply. An inverter circuit (a DC-AC converter) 3 is connected to the DC power supply 1 via a positive bus bar 2a and a negative bus bar 2b. A shunt resistance 4 serving as a current sensing element is inserted to the negative bus bar 2b side. The inverter circuit 3 includes N-channel type power MOSFETs 5 (U+, V+, W+, U−, V−, W−) which serve as switching elements and are connected into a three-phase bridge configuration, for example. The MOSFETs 5 have three-phase output terminals which are connected to phase windings of an electric motor 6 comprising a brushless DC motor, respectively.

A terminal voltage (a signal corresponding to a current value) of the shunt resistance 4 is detected by a current detection section (a current detection unit) 7. The current detection section 7 detects U-phase, V-phase and W-phase currents Iu, Iv and Iw based on the aforesaid terminal voltage and three-phase PWM signal patterns delivered to the inverter circuit 3. When the phase currents detected by the current detection section 7 are supplied to a DUTY generation section 8 which performs analog-to-digital (A/D) conversion of the phase currents and reads the results of conversion. The DUTY generation section 8 executes calculation based on control conditions for the motor 6 and the like, thereby determining duties U_DUTY, V_DUTY and W_DUTY serving to generate respective phase PWM signals.

For example, in execution of vector control, when supplied with a rotating speed command $\omega_{ref}$ of the motor 6 from a microcomputer which sets control conditions, or the like, the DUTY generation section 8 generates a torque current command $Iq_{ref}$ based on a difference between the rotating speed command $\omega_{ref}$ and an estimated actual rotating speed of the motor 6. When a rotor position θ of the motor 6 is determined from phase currents Iu, Iv and Iw of the motor 6, a torque current Iq and an excitation current $I_d$ are calculated by a vector control operation using the rotor position θ. A proportional-integral (PI) control operation is executed for the difference between the torque current command $Iq_{ref}$ and the torque current Iq, with the result that a voltage command Vq is generated. The same processing is carried out with respect to the excitation current Id side, so that a voltage command Vd is generated. The voltage commands Vq and Vd are converted to three-phase voltages Vu, Vv and Vw using the rotor position θ. The phase duties U_DUTY, V_DUTY and W_DUTY are determined based on the three-phase voltages Vu, Vv and Vw, respectively.

The three-phase duties U_DUTY, V_DUTY and W_DUTY are supplied to a PWM signal generation section 9 (a PWM signal generation unit) to be compared with a level of carrier, so that three-phase PWM signals are generated. Further, lower arm side signals are also generated by inverting the three-phase PWM signals. Dead time is added to the generated signals if necessary, and the signals are supplied to a drive circuit 10. The drive circuit 10 generates and delivers gate signals to gates of six power MOSFETs 5 (U+, V+, W+, U−, V− and W−) of the inverter circuit 3. Gate signals boosted by a necessary level are supplied to an upper arm side of the inverter circuit 3.

Next, the following will describe a manner of generating three-phase PWM signals by the PWM signal generation section 9. When the inverter circuit 3 generates and delivers pulse-width modulated three-phase alternating currents, the current of a specified phase can be detected according to an energization pattern for the upper arm side FETs 5 (U+, V+, W+), as described above. The following will describe three-phase upper arm side gate signals. For example, voltages generated at both ends of the shunt resistance 4 correspond to a U-phase current in a period of the energization pattern in which only the U phase is at an H level, and the V phase and W phase are each at an L level. Further, sign-inverted both end voltages of the shunt resistance 4 correspond to the W-phase current in a section where both U phase and V phase are each at the H level and the W phase is at the L level.

Thus, when two-phase currents are sequentially detected and stored according to the energization pattern of the PWM signal, three-phase currents can be detected though divided by time. In this case, an error actually occurs since the phase currents are not detected simultaneously. However, there is no problem in a practical use unless a specific exactness is required. An energization pattern for a subsequent period can be calculated by solving a circuit equation using three-phase current detection values.

Figure 11:
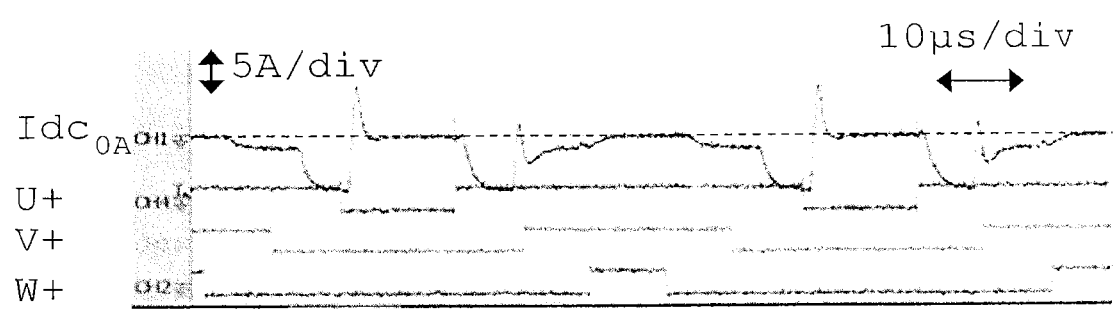
FIG. 11 shows varying motor currents.

Further, since the current waveform is unstable immediately after change in the on/off state of FET 5, a minimum standby time (a stability time) z is required in order that voltage signals generated by the shunt resistance 4 may be read in a stable state. FIG. 11 shows oscilloscope measurements (CH1) of the U-phase current waveform fluctuating in the switching of the PWM signal energization pattern. It is understood from FIG. 11 that the current waveform fluctuates to a large extent like ringing. When it is assumed that the standby time τ is set to 2 μsec, for example, a specific energization state (PWM signal pattern) is required to be continued for more than 2 μsec in order that one phase current may be read. In other words, current cannot be normally read when a continuous time in the same energization state is shorter than 2 μsec, with the result that the current value of the phase to be updated cannot be updated. More specifically, a phase current is detectable in any case if the energization states of all the PWM signal patterns can be continued for more than the minimum standby time τ.

In the embodiment, an output phase of each phase PWM signal pulse is shifted in a manner differing from conventional manners. In the case where differences between duties of phase pulses are constant, voltage applied to the motor 6 via the inverter circuit 3 remains unchanged even when a pulse rise location and a pulse fall location are shifted by the same time period. More specifically, PWM signal patterns of FIGS. 7A and 7B which will be described later apply the same voltage to the motor 6 since the interphase voltages are equal to each other.

Figure 3:
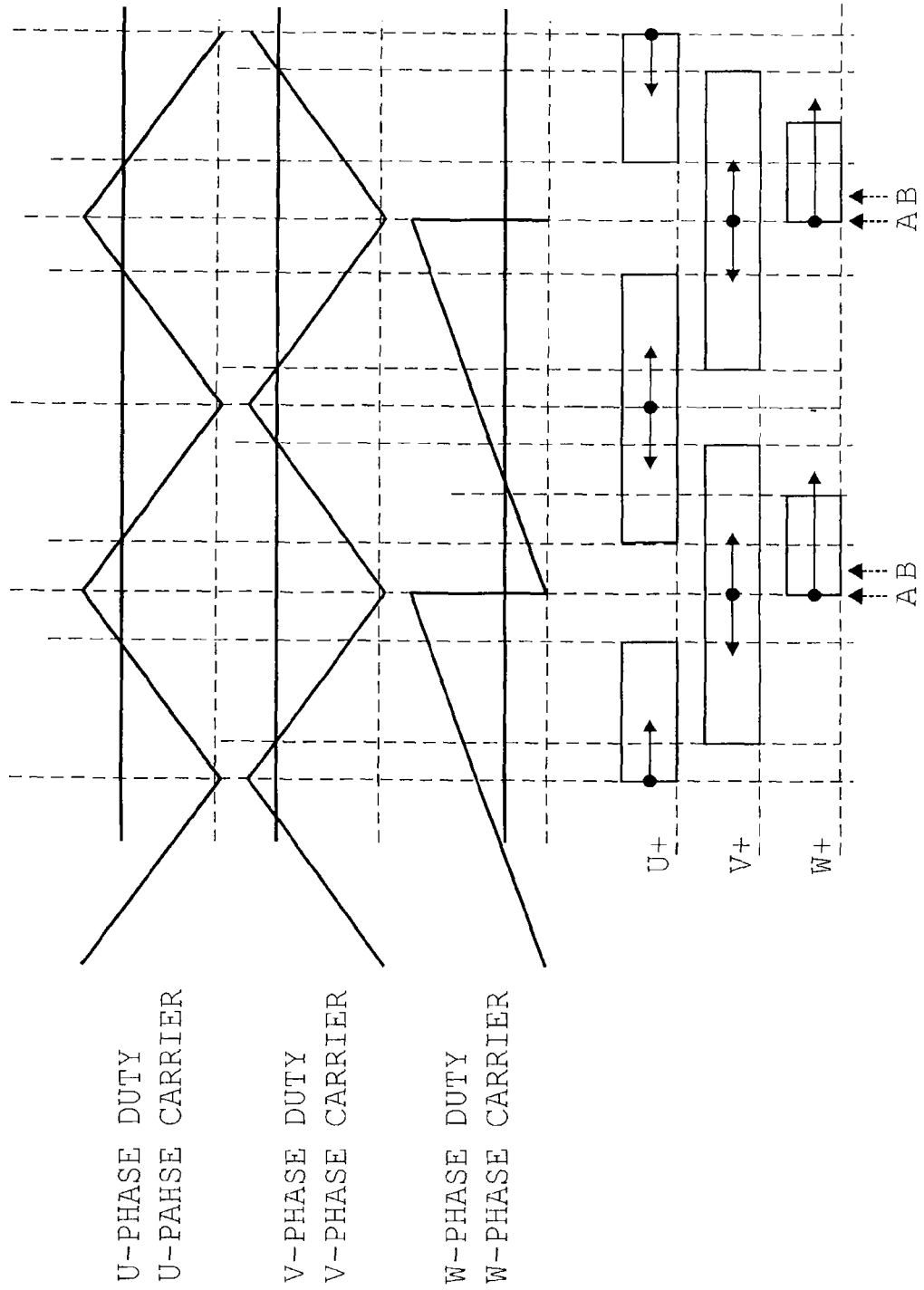
FIG. 3 is a timing chart showing three-phase PWM carriers and duty commands and generation of three-phase PWM pulses.

FIG. 3 shows generation of pulses of three-phase PWM signals (U+, V+, W+) at the upper arm side in the PWM signal generation section 9. Phase duties U-, V- and W-DUTIES are supplied from the DUTY generation section 8 to a pulse generation section 13, in which levels of the phase duties are compared with levels of carriers (carrier waves) of the U, V and W phases with the result that phase PWM signals U±, V± and W± are generated.

More specifically, carriers with different waveforms are used for every phase in the embodiment. A U-phase carrier is a triangular wave, a V-phase carrier is a triangular wave and a reverse phase to the U phase, and a W-phase carrier is a saw-tooth wave in which a count value of the V-phase carrier is cleared to zero at the minimum point. These carriers can be generated by three counters which count in synchronization with one another. For this purpose, up/down counters are provided for the U and V phases respectively, and an up counter is provided for the W phase. The frequency at which the up/down counters count is twice as high as the frequency of the other counter. A carrier periods are set to 50 μsec, for example.

The pulse generation section 13 compares levels of phase duties U-, V- and W-DUTIES with levels of the phase carriers respectively, thereby generating and delivering high level pulses in a period when duty >carrier. As a result, as shown in the three-phase PWM pulses of FIG. 3, when a minimum amplitude phase of the V-phase carrier (a trough of triangular wave) is a reference phase, the pulse width of the U-phase PWM signal U+ is changed to be increased/decreased to the phase lead side and to the phase lag side with a reference point being away by one half of the carrier period from the aforesaid reference phase. The pulse width of the W-phase PWM signal W+ is changed to be increased/decreased to the phase lead side from the reference phase. The pulse width of the V-phase PWM signal V+ is changed to be increased/decreased to the phase lead side and to the phase lag side from the reference phase.

The current detection section 7 is supplied with a current detection time-point signal (the V-phase carrier, for example) from the PWM signal generation section 9. The current detection section 7 determines a time-point to detect two-phase currents according to the current detection timing signal. For example, assume that the minimum amplitude phase of the V-phase carrier is a reference phase. More specifically, when the reference phase is determined to be a detection time-point A, a time point where a time period of not less than the standby time τ elapses refers to a detection time-point B. When the detection time-points are set in this manner, the V-phase current Iv can be detected at the time-point A and the U-phase current (−) Iu can be detected at the time-point B. The carrier the current detection section 7 refers to for determination of the current detection time-points should not be limited to the V phase but may be the U or W phase. Since the W-phase current Iw is obtained on the basis of U- and V-phase currents since the sum total of three-phase currents is zero.

Figure 4:
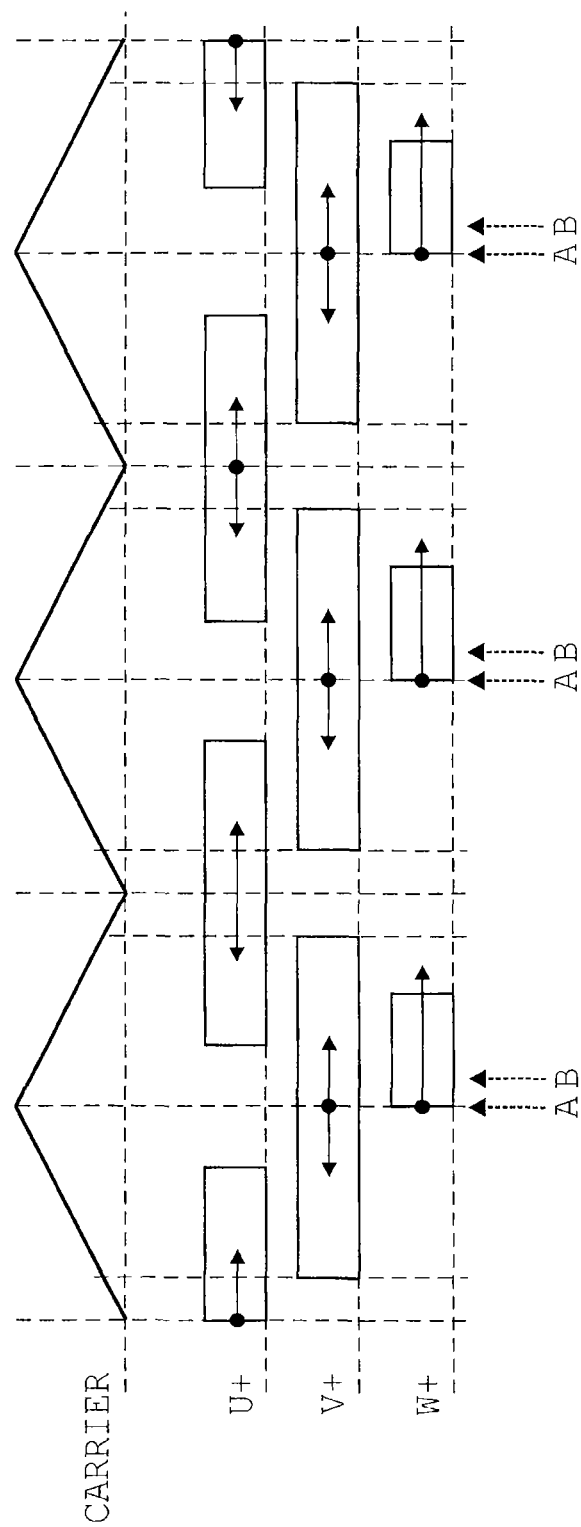
FIG. 4 is a timing chart corresponding to the three-phase PWM pulses in FIG. 3 in the case where the phase indicating the maximum V-phase carrier is a reference.

Further, FIG. 4 shows a case where a phase (trough of triangular wave) in which the V-phase carrier is maximum. Although the U phase and the W phase are not shown in FIG. 4, the U-phase carrier is obtained by reversing the U-phase carrier as shown in FIG. 3, and the W-phase carrier as shown in FIG. 3 can be used without change. In this case, the polarity to be compared is reversed to that in FIG. 3 with respect to the U phase and the V phase. Further, the U, V and W phases may be interchanged, that is, it is optional which waveform carrier should be assigned to any one of phases.

Figure 5:
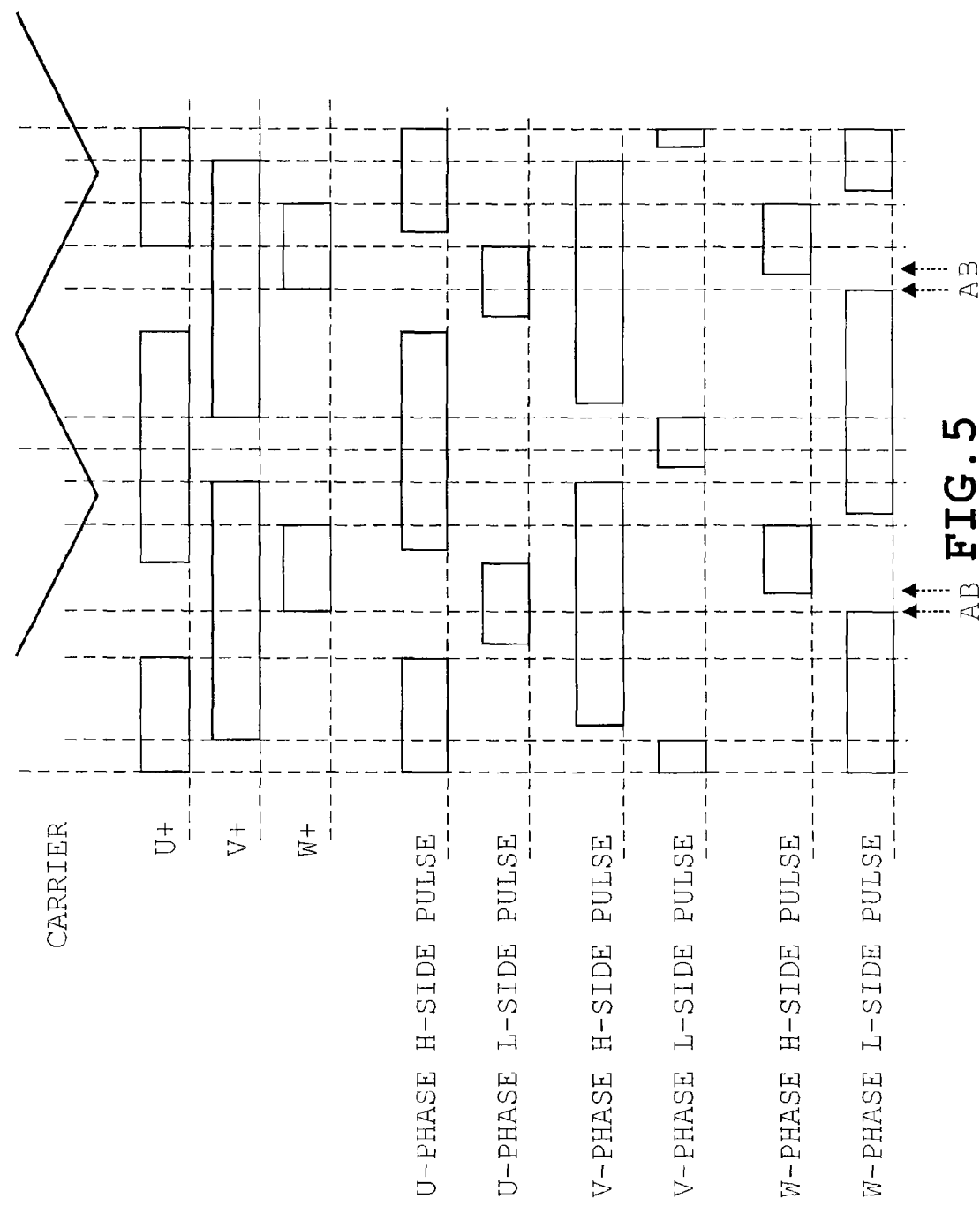
FIG. 5 is a timing chart showing the case where dead times are affixed to the PWM signal pulses as shown in FIG. 3.

FIG. 5 shows a case where dead time is generated in the PWM signal pulse as shown in FIG. 3. FIG. 5 shows the same waveforms as those of FIG. 3. Dead times are generated by subtracting predetermined duties uniformly from rises of U±, V± and W± signals. When the dead times are generated in this manner, there is a possibility that the switching element 5W+ would not be on at the detection timing B. In view of the possibility, the detection time-point B is adjusted to be shifted to the phase lag side by the dead time period with respect to FIG. 4. Further, since the dead time generation patterns should not be limited to those shown in FIG. 5, the current detection time-points A and B may be shifted according to the generation patterns.

Figure 6:
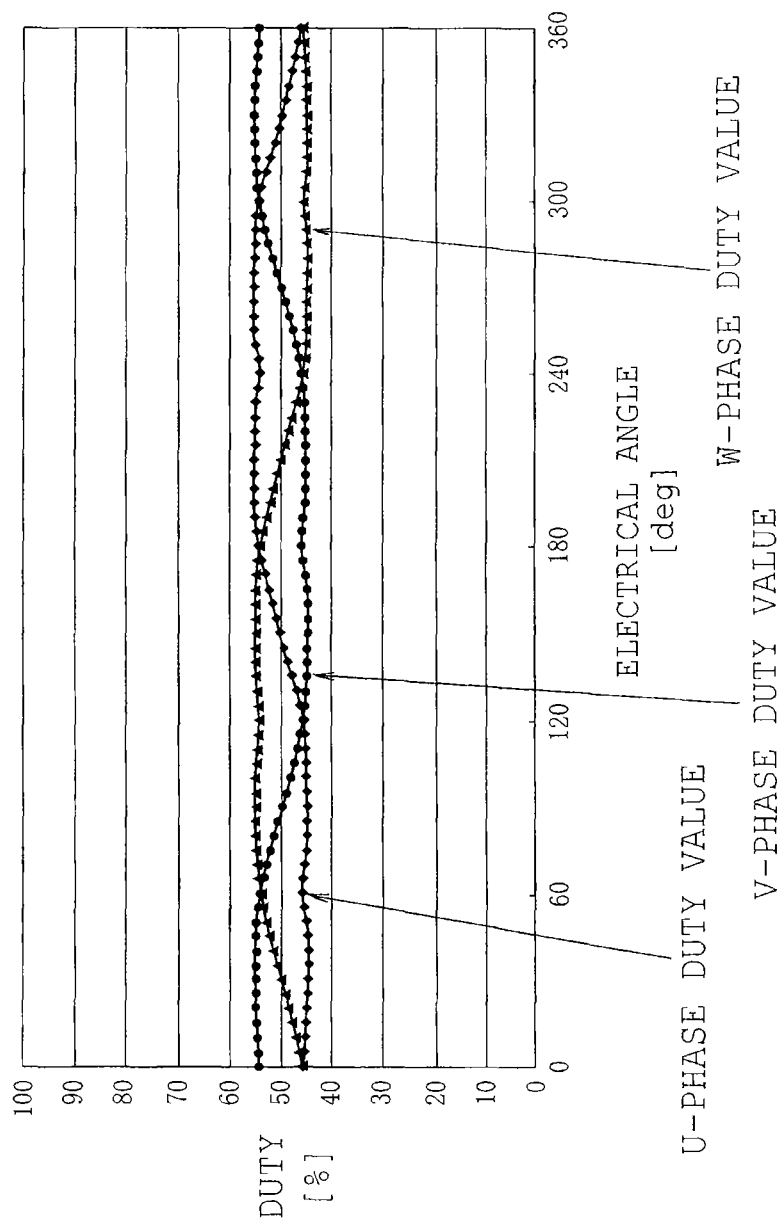
FIG. 6 is a graph showing three-phase set duties corresponding to the case where the voltage applied to the motor is near 0 V.

The following will describe influences of phase duty changes upon current detection in the case where three-phase PWM signal pulses are generated and delivered in the above-described phase relationship. FIG. 6 shows three-phase set duties corresponding to motor electrical angles (rotor positions θ) in the case where the voltage applied to the motor 6 is approximate to 0 V. In this case, since the three-phase duties are approximately 50% and are antagonistic to one another, no currents can be detected at the detection time-points A and B when the centers of the three-phase PWM signal pulses are coordinated with one another at the zero level of the carrier, as shown in FIG. 7A, for example. However, since the three-phase PWM signal patterns are obtained by the manner of the embodiment as shown in FIG. 7B, two-phase currents are detectable at detection time-points A and B.

Figure 8:
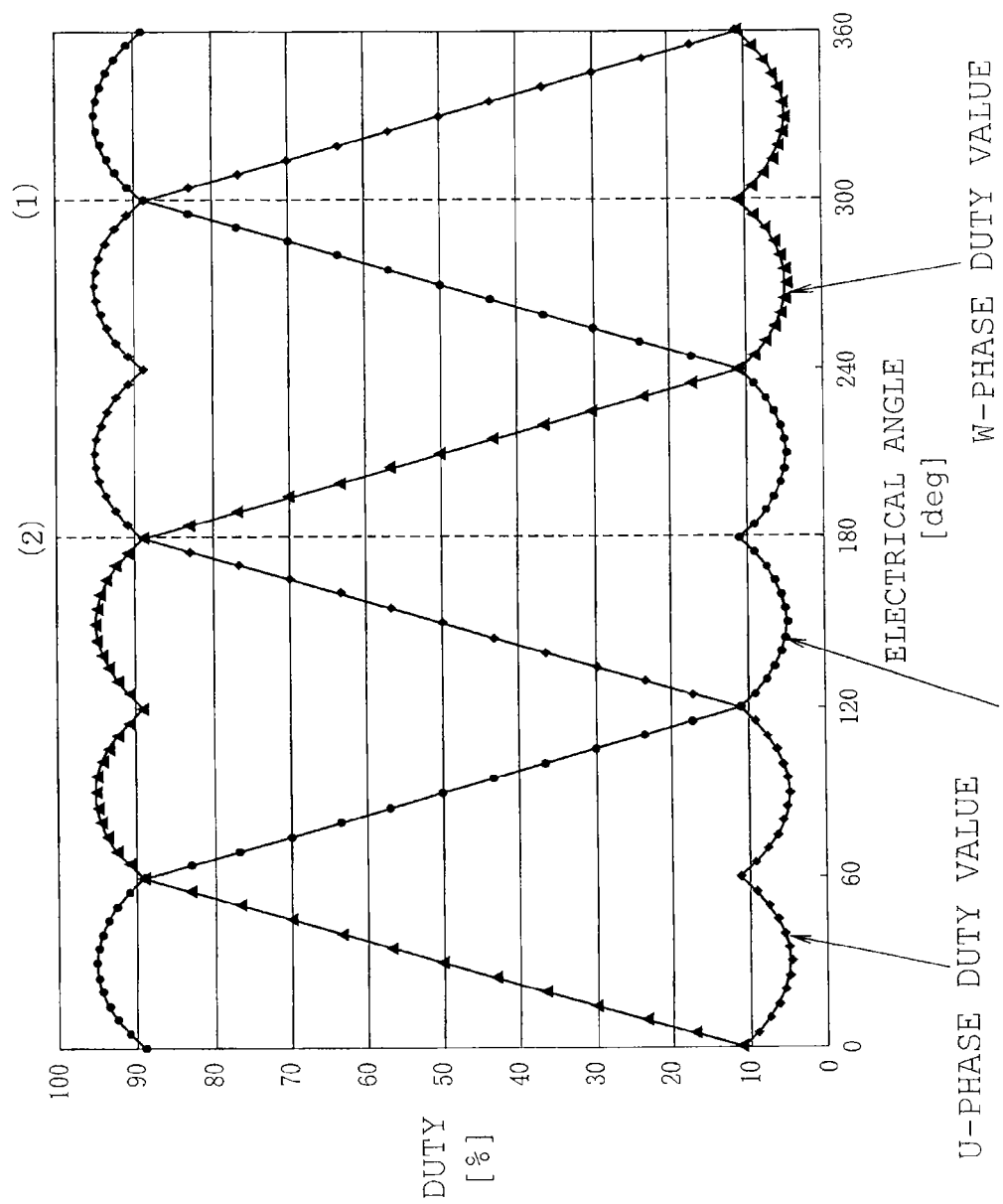
FIG. 8 is a graph corresponding to FIG. 6 in the case where the voltage applied to the motor is high.
Figure 9:
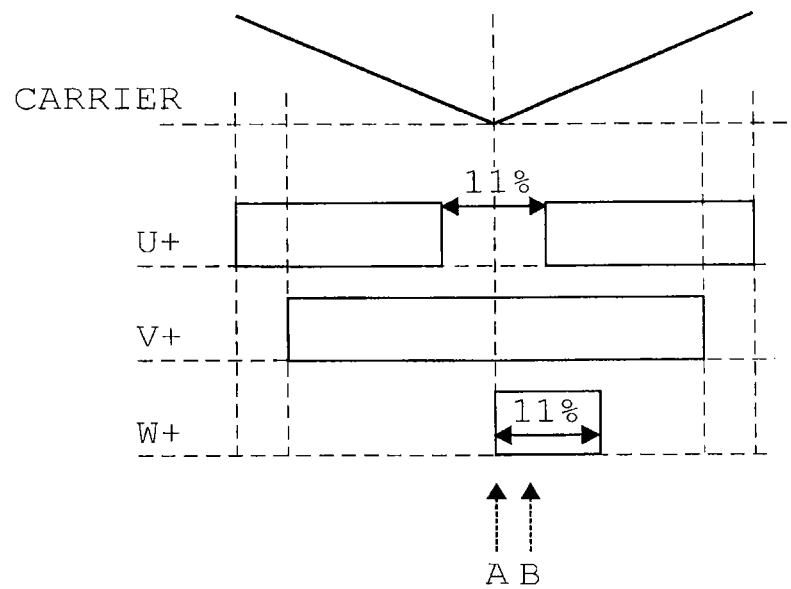
FIG. 9 is a view corresponding to FIG. 7B in the case where the electrical angle is 300° in FIG. 8.

FIG. 8 shows three-phase set duties in the case where the voltage applied to the motor 6 is higher. In FIG. 8, symbol (1) shows a case where an electrical angle is 300°, both U-phase and V-phase duties are 89% and the W-phase duty is 11%. In this case, the W phase is shifted from the trough of triangular wave to the phase lag side by the length, 11%/2=5.5%=3 μsec, in the PWM pattern as shown in FIG. 9. More specifically, the V phase and the W phase are simultaneously turned on for 3 μsec when i=2 μsec, with the result that the U-phase current is detectable.

Figure 10:
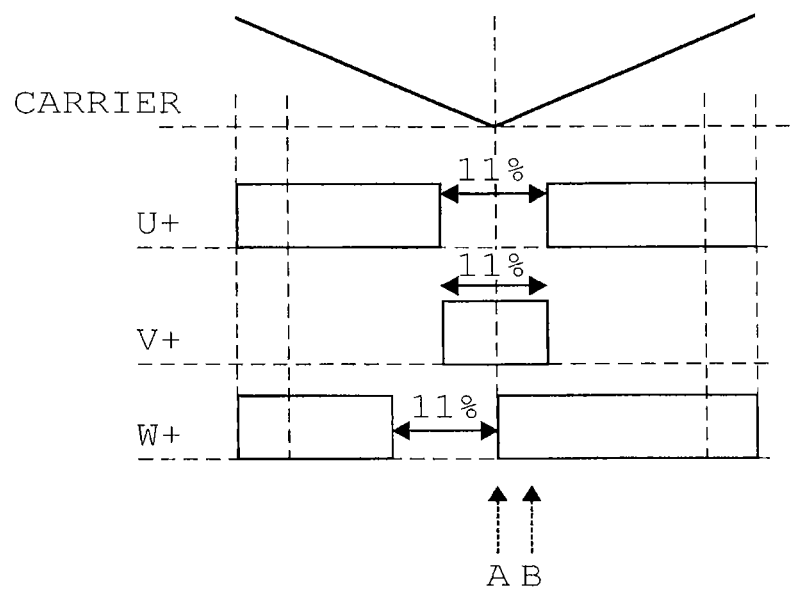
FIG. 10 is a view corresponding to FIG. 7B in the case where the electrical angle is 180° in FIG. 8.

FIG. 10 shows the case (2) where the electrical angle is 180°. In this case, both U-phase and W-phase duties are 89% and the V-phase duty is 11%. In this case, too, the current can successfully be detected at detection timings A and B.

Figure 23:
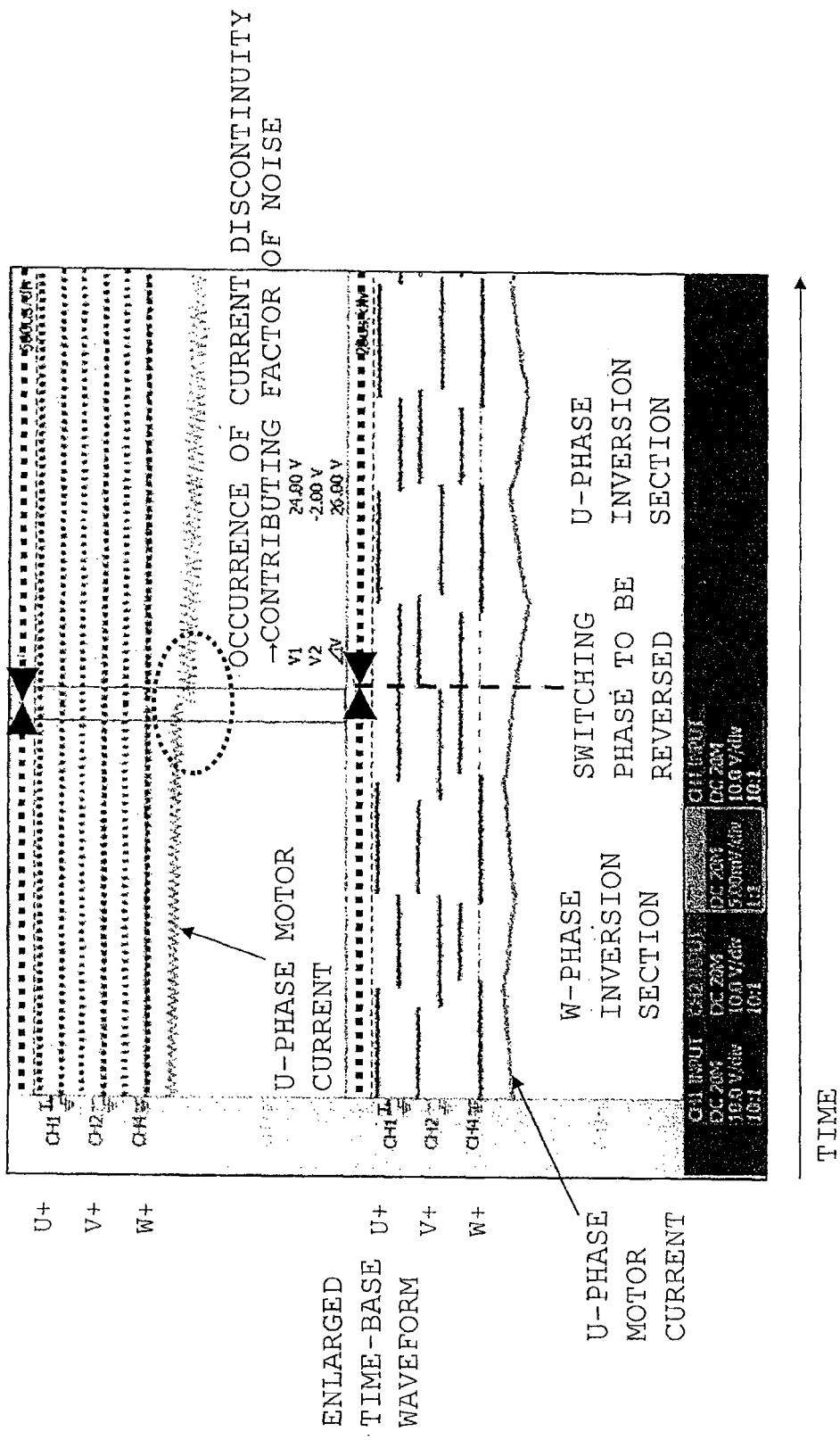
FIG. 23 show waveforms obtained by measuring U phase current.

Thus, even though the phase set duties differ from one another, the reference phase used to increase/decrease PWM signal pulses remains fixed. Three-phase motor currents can be detected over all the PWM patterns even when the current detection time-points are fixed. Accordingly, since torque fluctuations and noise are prevented without a stepwise change in the phase currents, three-phase motor currents can be detected both in the case where the voltage applied to the motor is low and in the case where the voltage applied to the motor is high, as shown in FIG. 23. A theoretically detectable maximum motor voltage ranges between the case where two-phase duties run to (carrier period−(standby time τ×2)) and the case where the minimum duty drops to (standby time τ×2).

According to the above-described embodiment, when the MOSFETs 5U±, 5V± and 5W± are on-off controlled according to the predetermined PWM signal pattern, the shunt resistance 4 is connected to the DC bus bar 2b side of the inverter circuit 3, and the PWM signal generation section 9 determines the rotor position θ based on the three-phase motor currents of the motor 6. The PWM signal generation section 9 generates three-phase PWM signal patterns so that the three-phase PWM signal patterns follow the rotor position θ. When the current detection section 7 detects phase currents of the motor 6 based on the signal generated by the shunt resistance 4 and the PWM signal patterns, the PWM signal generation section 9 generates three-phase PWM signal patterns so that the current detection section 7 is capable of detecting two-phase currents at two fixed time-points A and B within the carrier period. Accordingly, torque fluctuations and noise production are prevented without the stepwise change in the phase currents. As a result, differing from the conventional art, the motor control device of the embodiment can detect three-phase currents Iu, Iv and Iw in a range from the case where the applied voltage to the motor is low to the case where the applied voltage to the motor is high.

In this case, the PWM signal generation section 9 increases/decreases the duty in both directions, that is, to the phase lag side and to the phase lead side on the basis of any phase in the carrier period regarding one phase (first phase) of three-phase PWM signals, increases/decreases the duty in both directions, that is, to the phase lag side and to the phase lead side on the basis of the phase spaced away one half of the carrier period from the basis of the first phase regarding another phase (a second phase) and increases/decreases the duty to the phase lag side on the basis of any phase in the carrier period regarding the remaining phase (a third phase).

Accordingly, the detection time-points are fixed so as to be involved in a first section where only the second phase switching element is on and a second section where the second and third phase switching elements are simultaneously on. As a result, the second phase current is detectable in the first section, and the first phase current is detectable in the second section. Since the PWM signal generation section 9 sets the phase references based on a phase in which the carrier amplitude becomes maximum or minimum, the current detection time-point of the current detection section 7 can easily be set based on the aforementioned phases.

Further, the PWM signal generation section 9 uses as the carriers the triangular waves reversed in phase regarding the U and V phases of the three-phase PWM signals. Regarding the W phase, the PWM signal generation section 9 uses the saw-tooth waveform as the carrier. The saw-tooth waveform is based on the phase in which the amplitude of the triangular wave of the V-phase carrier is minimum. The references of the respective phases are set based on the phase in which all the maximum or minimum values of carrier amplitudes correspond with one another. Accordingly, the phase direction in which the duties of the phase PWM signals are increased/decreased can be changed by using the carriers of different waveforms for every phase.

Figure 12:
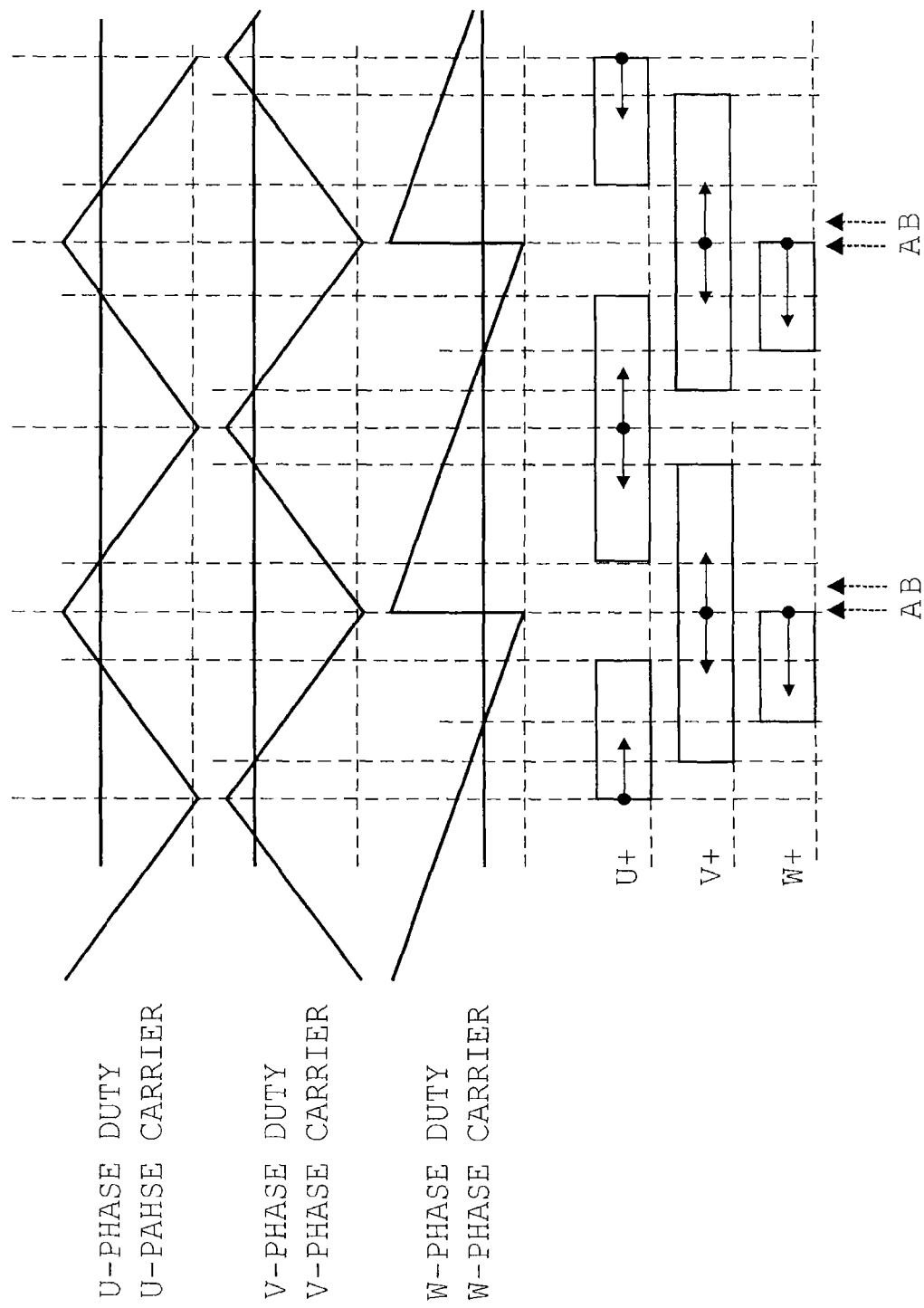
FIG. 12 is a view similar to FIG. 3, showing a second embodiment.

FIG. 12 shows a second embodiment. In the second embodiment, identical or similar parts or components are labeled by the same reference symbols as those in the first embodiment. Only the differences will be described as follows. The same carriers of U and V phases as those in the first embodiment are used in FIG. 12. A saw-tooth wave reversed in phase with respect to the carrier in the first embodiment is used regarding the W phase.

Assume now that the trough of the triangular wave of the V-phase carrier serves as the detection time-point A and that the time-point B occurs after lapse of standby time τ from the time-point A. In this case, the negative polarity U-phase current Iu is detectable at the time-point A since the switching elements V+ and W+ are on at the time-point A. The positive polarity V-phase current Iv is detectable at the time-point B since only the switching element V+ is on. Accordingly, the three-phase currents are detectable in this case, too. Thus, the second embodiment can achieve the same advantageous effect as the first embodiment.

Figure 13:
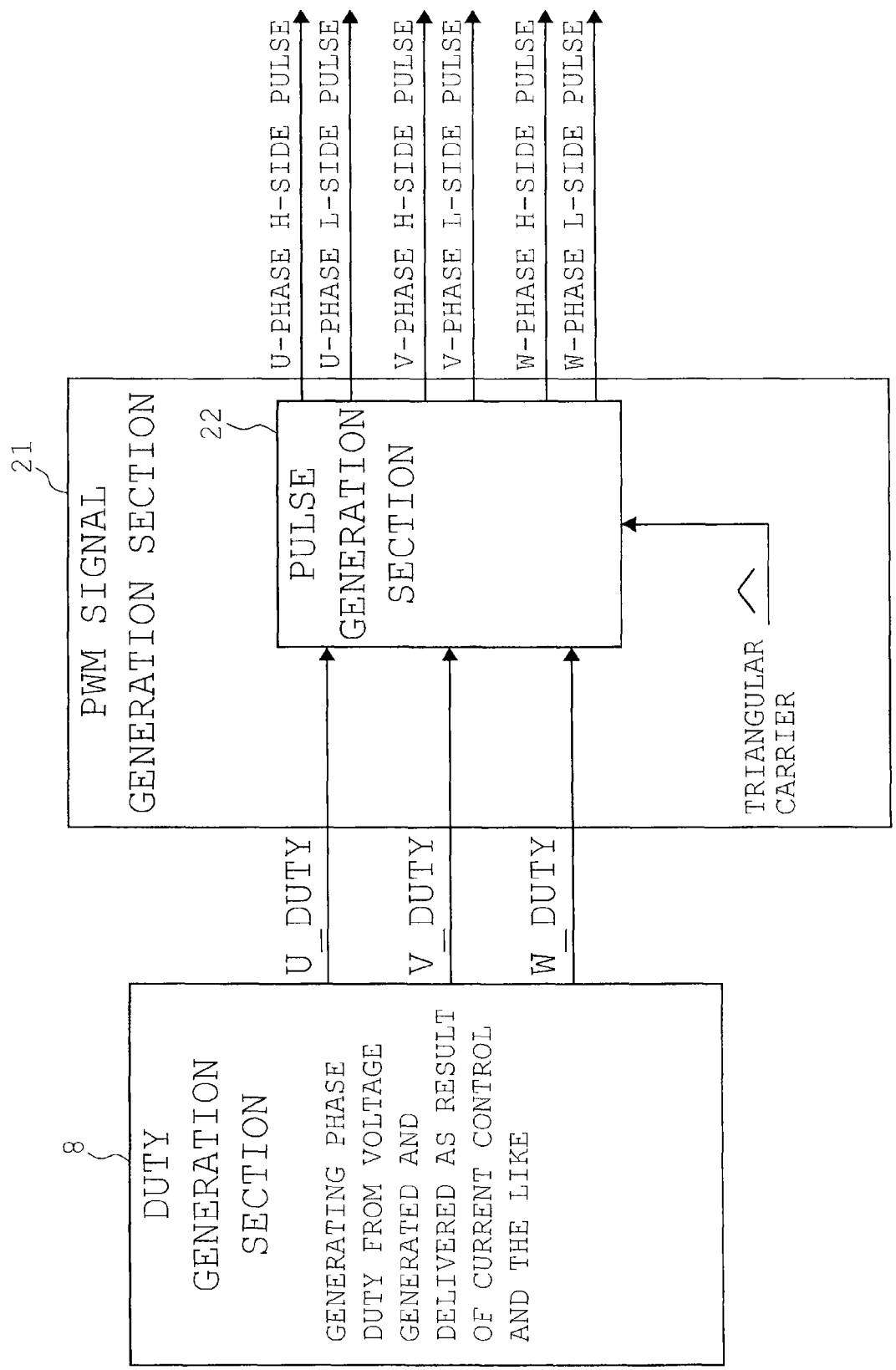
FIG. 13 is a view similar to FIG. 2, showing a third embodiment.
Figure 14:
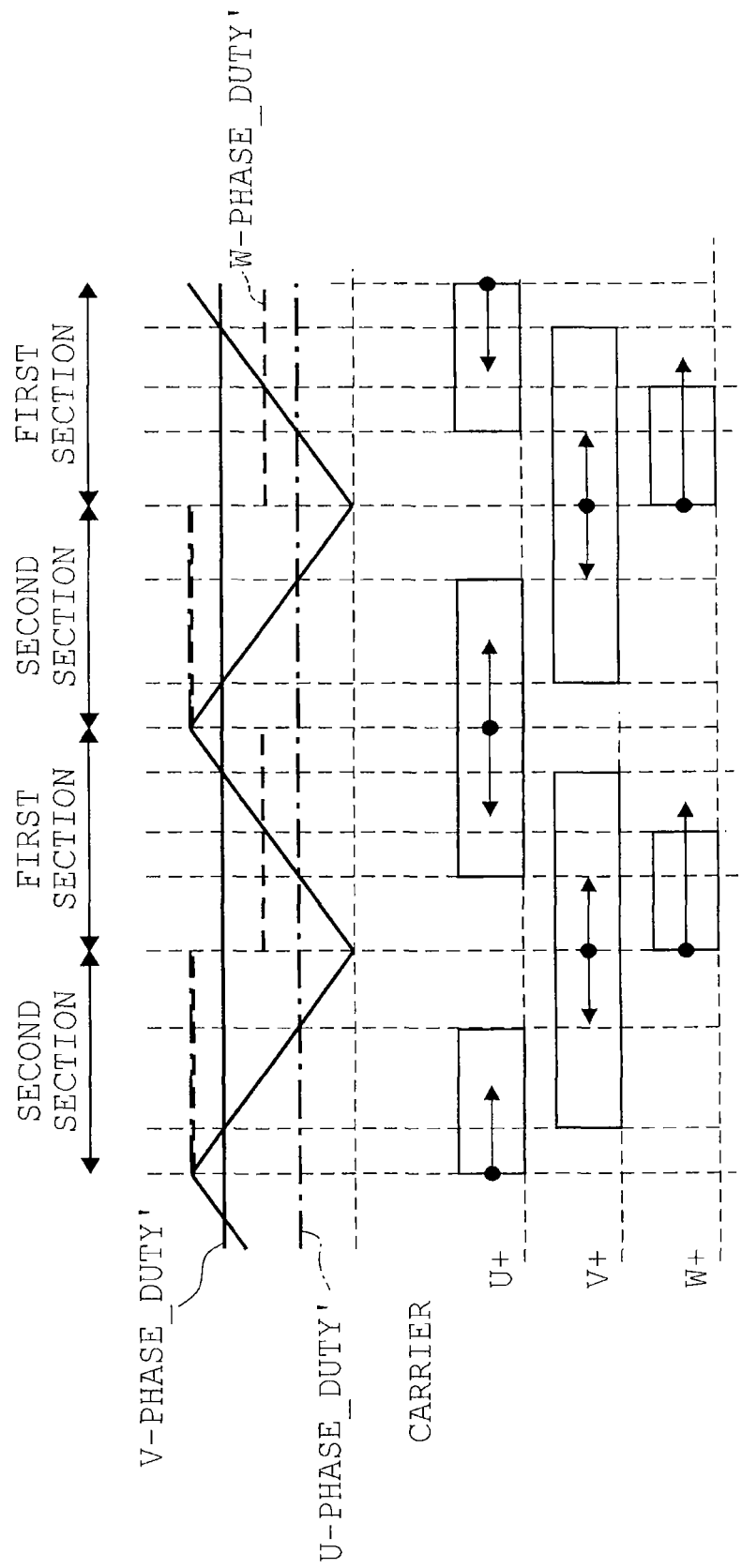
FIG. 14 is a view similar to FIG. 3.

FIGS. 13 to 15 show a third embodiment. FIG. 13 is similar to FIG. 2 and shows the configuration of a PWM signal generation section (a PWM signal generation unit) 21 provided instead of the PWM signal generation section 9. The PWM signal generation section 21 includes a pulse generation section 22 provided instead of the pulse generation section 13. The pulse generation section 22 performs a logical operation in order to shift the phase PWM signal pulses in the same manner as in the first embodiment while using only a single triangular wave carrier.

FIG. 14 shows a manner of generating three-phase PWM signal pulses by comparing the three-phase duties U_DUTY', V_DUTY' and W_DUTY'. In FIG. 14-A, the alternate long and short dash line denotes the U-phase duty U_DUTY', the solid line denotes the V-phase duty V_DUTY' and the broken line denotes the W-phase duty W_DUTY'. Regarding the U phase, the pulse generation section 21 generates and delivers PWM signal pulses in a period when the U-phase duty command U_DUTY' is lower than the carrier. Regarding the V phase, the pulse generation section 21 generates and delivers PWM signal pulses in a period when the V-phase duty command V_DUTY' is higher than the carrier.

Assume that a period in which the amplitude of carrier is increased is referred to as a first section and a period in which the carrier amplitude is decreased is referred to as a second section. Regarding the W phase, the PWM signal pulses are generated and delivered in the first section when the W-phase duty command W_DUTY' is higher than the carrier. The PWM signal pulses are generated and delivered in the second section when the W-phase duty command W_DUTY' is lower than the carrier. As a result, the output patterns of three-phase PWM signal pulses are the same as those in the first embodiment. FIG. 15 shows the logics of the above-described signal processing performed by the pulse generation section 22.

The following will describe the setting of three-phase duties. As an example, assume that the U-phase and V-phase duties U_DUTY and V_DUTY are each 80%, the W-phase duty W_DUTY is 30% and the maximum amplitude MAX of carrier is 100%. Firstly, regarding the U phase, H pulses are generated and delivered in a section where the duty is normally lower than the triangular carrier. The U-phase duty command U_DUTY' is obtained by subtracting the U-phase duty U_DUTY processed by the DUTY generation section 8 from the maximum amplitude MAX. The U-phase duty command U_DUTY' is compared with the carrier (U_DUTY'=100%−U_DUTY). As a result, H pulses are generated and delivered with the carrier ridge as the center in 80% of the period.

Further, regarding the V phase, H pulses are generated and delivered in a section where the DUTY is normally higher than the triangular carrier. The V-phase duty V_DUTY processed by the DUTY generation section 8 is used as the V-phase duty command V_DUTY', which is compared with the carrier (V_DUTY'=V_DUTY). As a result, H pulses are generated and delivered with the carrier valley as the center in 80% of the period.

Regarding the W phase, the value 60% is obtained by doubling the W-phase duty W_DUTY of 30% processed by the DUTY generation section 8, serving as the W-phase duty command W_DUTY'. The W-phase duty command W_DUTY' is compared with the carrier in the first section. In the second section, the carrier MAX value 100% as the W-phase duty command W_DUTY' is compared with the carrier. Since the PWM signal generation section 21 is based on the logic that H-level pulses are generated when the duty is lower than the carrier, no pulses are generated although the W-phase duty command W_DUTY' is the MAX value. As a result, the W-phase pulses are generated and delivered from the carrier valley toward the carrier ridge in the 30% PWM period.

The foregoing describes the case of the three-phase PWM signal pulses as shown in FIG. 14. However, set values differ depending on values of three-phase duties. Accordingly, FIG. 15 generalizes the logic of conversion of DUTY-→DUTY'. More specifically, the V-phase duty V_DUTY is set without change regarding the V phase, and the value obtained by subtracting the U-phase duty U_DUTY from the carrier MAX value is set and the polarity to be compared is reversed with respect to the V phase.

Regarding the W phase, when a twofold value of the W-phase duty W_DUTY is smaller than the carrier MAX value, the W-phase duty command W_DUTY' generated and delivered in the first section is set to the aforementioned twofold value, and the W-phase duty command W_DUTY' generated and delivered in the second section is set to the carrier MAX value. Further, when the twofold value is larger than the carrier MAX value, the W-phase duty command W_DUTY' in the first section is set to the carrier MAX value and the W-phase duty command W_DUTY' in the second section is set to a value obtained by subtracting the twofold value from the doubled carrier MAX value.

According to the third embodiment, the PWM signal generation section 21 uses the triangular wave as the carrier. When the section where the amplitude of the triangular wave is increased is referred to as the first section and the section where the amplitude is decreased is referred to as the second section, a comparison condition based on which the carrier amplitude and the PWM command are compared, with the result that the PWM signal is generated and delivered. The comparison condition is constant in each of the first and second sections and is reversed with respect to each other regarding the U and V phases. The comparison condition is changed between the first and second section regarding the W phase.

The value obtained by subtracting the U-phase duty U_DUTY from the carrier MAX value is set regarding the U phase, and the V-phase duty V_DUTY is set without change regarding the V phase. Regarding the W phase, the twofold value of the W-phase duty W_DUTY is compared with the carrier MAX value. The U-phase duty command U_DUTY' and the W-phase duty command W_DUTY' set with respect to the first and second sections are converted according to the logics as shown in FIG. 15 depending on the result of comparison. Accordingly, the third embodiment can achieve the same effects as the first embodiment without use of three types of carriers as in the first embodiment. Any one of the U, V and W phases may optionally be applied to the comparison condition.

Figure 16:
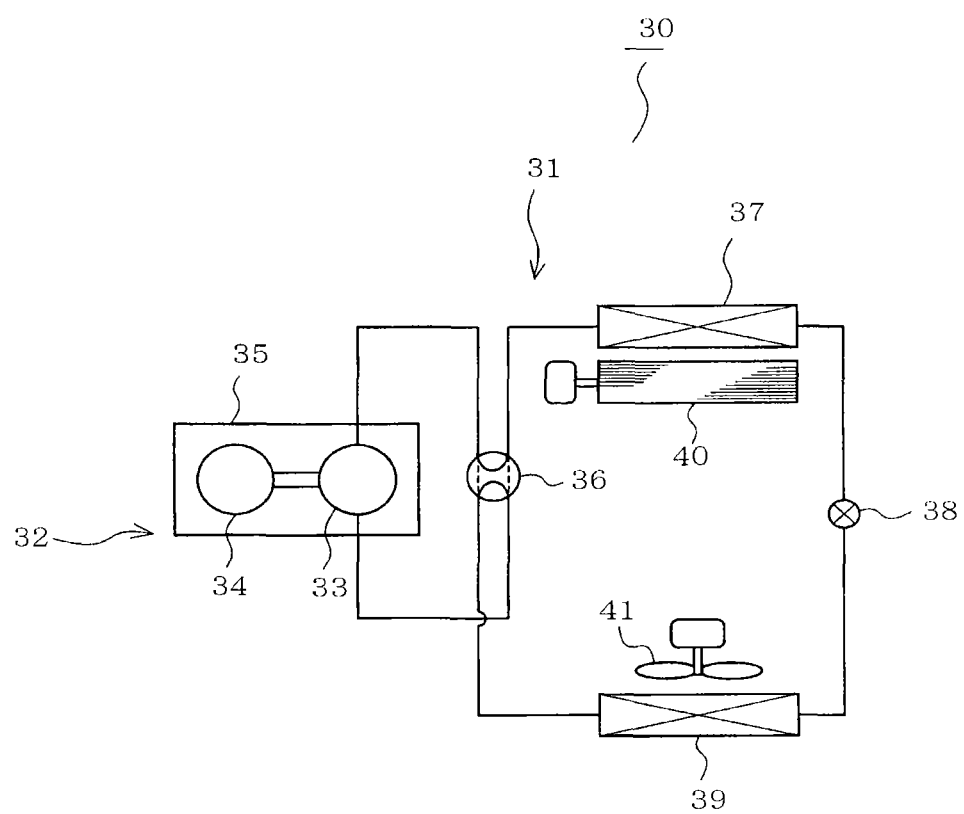
FIG. 16 shows a schematic configuration of heat pump system employed in an air conditioner according to a fourth embodiment.

FIG. 16 shows a fourth embodiment, in which the motor control device is configured to control a compressor motor of an air conditioner. An air conditioner 30 includes a heat pump system 31 further including a compressor (load) 32. The compressor 32 includes a compressing section 33 and an electric motor 34 both of which are housed in a common iron closed container 35. The motor 34 has a rotor shaft connected to the compressing section 33. The compressor 32, a four-way valve 36, an indoor heat exchanger 37, a decompressor 28 and an outdoor heat exchanger 39 are connected by pipes serving as a heat transfer medium flow path so as to form a closed loop. The compressor 32 is of rotary type, and the motor 34 is a three-phase interior permanent magnet (IPM) motor (a brushless DC motor), for example.

The four-way valve 36 is in a state as shown by solid line in FIG. 16 in a warming operation. A high-temperature refrigerant compressed by the compressing section 33 of the compressor 32 is supplied from the four-way valve 36 to indoor heat exchanger 37 to be compressed. Subsequently, the compressed refrigerant is decompressed by the decompressor 38, so that the low temperature refrigerant flows into the outdoor heat exchanger 39 to be evaporated and returned to the compressor 32. On the other hand, in a cooling operation, the four-way valve 36 is switched to a state as shown by broken line in FIG. 16. Accordingly, the high-temperature refrigerant compressed by the compressing section 33 is supplied from the four-way valve 36 into outdoor heat exchanger 39 thereby to be compressed. Subsequently, the compressed refrigerant is decompressed by the decompressor 8, so that the low temperature refrigerant flows into the indoor heat exchanger 37 thereby to be evaporated and returned into the compressor 32. Fans 40 and 41 are configured to perform a blowing operation for the respective indoor and outdoor heat exchangers 37 and 38, so that heat exchange is efficiently performed between the heat exchangers 37 and 39 and indoor air and outdoor air by the blowing operation. The motor 34 is controlled by any one of the motor control devices of the first to third embodiments.

According to the fourth embodiment, the motor 34 of the compressor 32 of the heat pump system 31 is controlled by the motor control device of any one of the embodiments, with the result that an operating efficiency of the air conditioner 30 can be improved.

Figure 17:
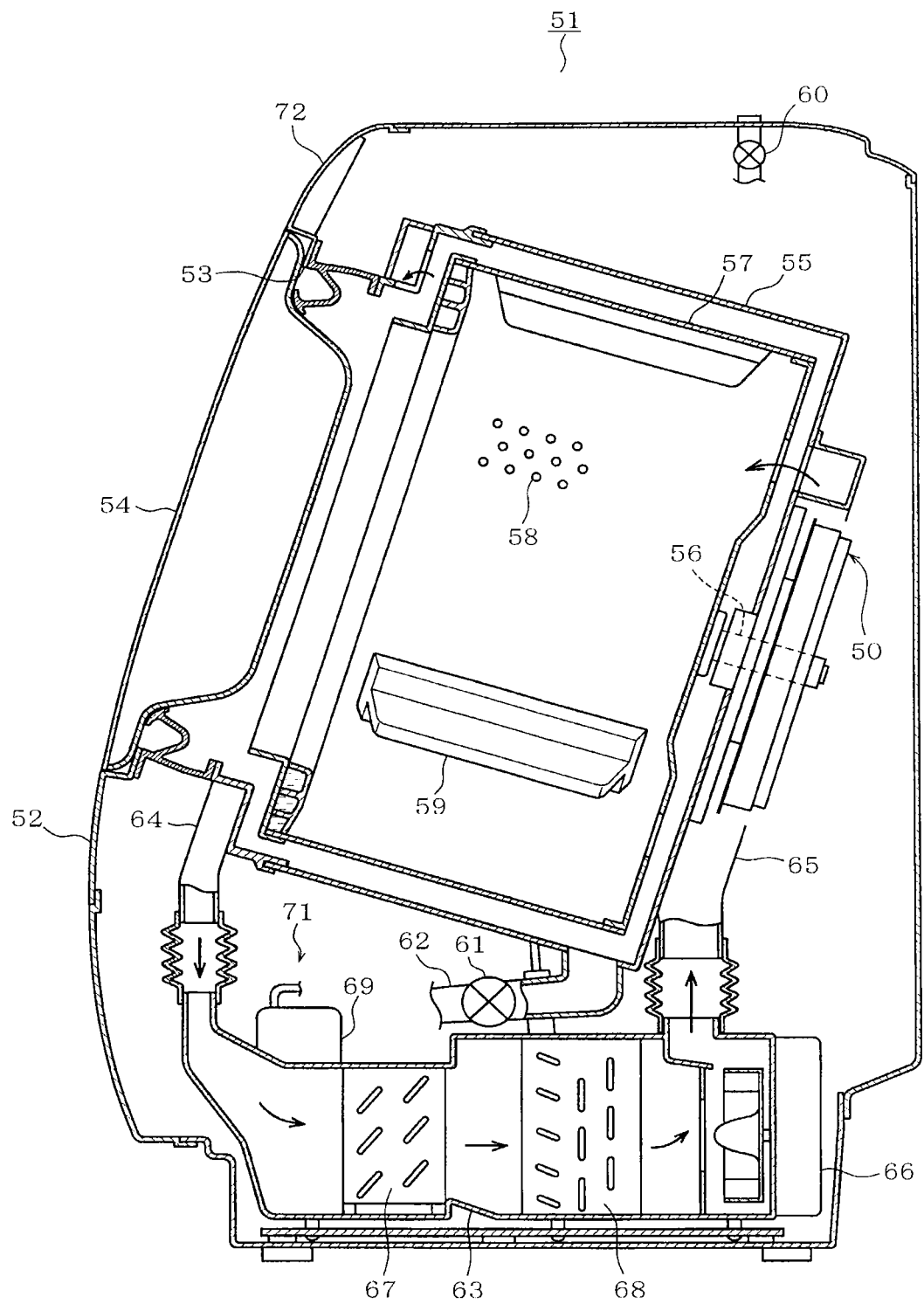
FIG. 17 is a longitudinally sectional side view of a washing-drying machine according to a fifth embodiment.
Figure 18:
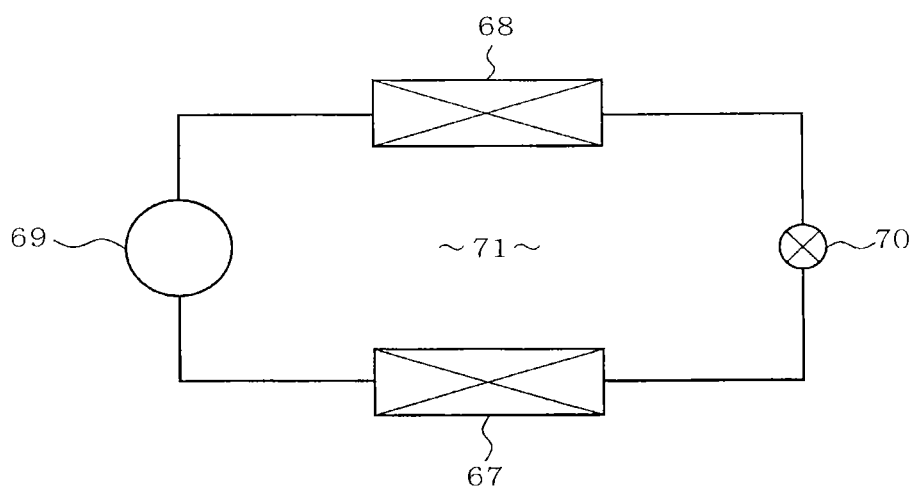
FIG. 18 schematically shows the heat pump system.

FIGS. 17 and 18 show a fifth embodiment. The motor control device is applied to a drum motor and/or a compressor motor of a washing-drying machine in the fifth embodiment. Referring to FIG. 17, an inner construction of the drum type washing-drying machine 51 is schematically shown. An outer casing 52 forming an envelope of the drum washing-drying machine 51 includes a front having a circular laundry access opening 53 opened and closed by a door 54. A bottomed cylindrical water tub 55 is disposed in the outer casing 52. An electric motor 50 includes a stator secured to a central rear of the water tub 55 by a screw. The motor 50 has a rotating shaft 56 including a rear end (a right end as viewed in FIG. 17) fixed to a shaft mount of a rotor of the motor 50. The rotating shaft 56 also includes a front end (a left end as viewed in FIG. 17) protruding into an interior of the water tub 55.

A bottomed cylindrical drum 57 having a closed rear is fixed to the front end of the rotating shaft 56 so as to be coaxial with the water tub 55 upon drive of the motor 50. The drum 57 is rotated together with the rotor and the rotating shaft 56. The drum 57 is provided with a plurality of airflow holes 58 through which air and water are capable of flowing and a plurality of baffles 59 provided for scraping and unwinding laundry in the drum 57. A water-supply valve 60 is connected to the water tub 55. When the water-supply valve 60 is opened, water is supplied to the water tub 55. A drain hose 62 having a drain valve 61 is also connected to the water tub 55. When the drain valve 61 is opened, water is discharged from the water tub 55.

A blowing duct 63 extending in a front-back direction is provided below the water tub 55. The blowing duct 63 has a front end communicating via a front duct 64 with an interior of the water tub 55 and a rear end communicating via a rear duct 65 with the interior of the water tub 55. A blowing fan 66 is provided on the rear end of the blowing duct 63. Air in the water tub 55 is supplied through the front duct 64 into the blowing duct 63 and returned through the rear duct 65 into the water tub 55, as shown by arrows in FIG. 17.

An evaporator 67 is disposed at the front end side of the interior of the blowing duct 63, and a condenser 68 is disposed at the rear end side of the interior of the blowing duct 63. The evaporator 67 and the condenser 68 form the heat pump 71 together with a compressor 69 and a throttle valve 70 (see FIG. 18). Air flowing in the blowing duct 63 is dehumidified by the evaporator 67 and then heated by the condenser 68 to be circulated into the water tub 55. The throttle valve 70 comprises an expansion valve and has an opening adjusting function.

An operation panel 72 is mounted on the front of the outer casing 52 so as to be located above the door 54. The operation panel 72 includes a plurality of operation switches (not shown) to set an operation course and the like. A control circuit section (not shown) is connected to the operation panel 72. The control circuit section is mainly composed of a microcomputer and controls an overall operation of the drum type washing-drying machine 51. The control circuit section executes various operation courses while controlling the motor 50, water-supply valve 60, drain valve 61, compressor 69 throttle valve 70 and the like according to the contents set via the operation panel 27. The motor 50 and/or a compressor motor of the compressor 69 is controlled by the motor control device of any one of the first to third embodiments.

According to the fifth embodiment, the motor 50 for rotating the drum in the washing-drying machine 51 and/or the motor of the compressor 69 of the heat pump system 71 is controlled by any one of the motor control device. This can improve the operation condition of the washing-drying machine 51.

Figure 19:
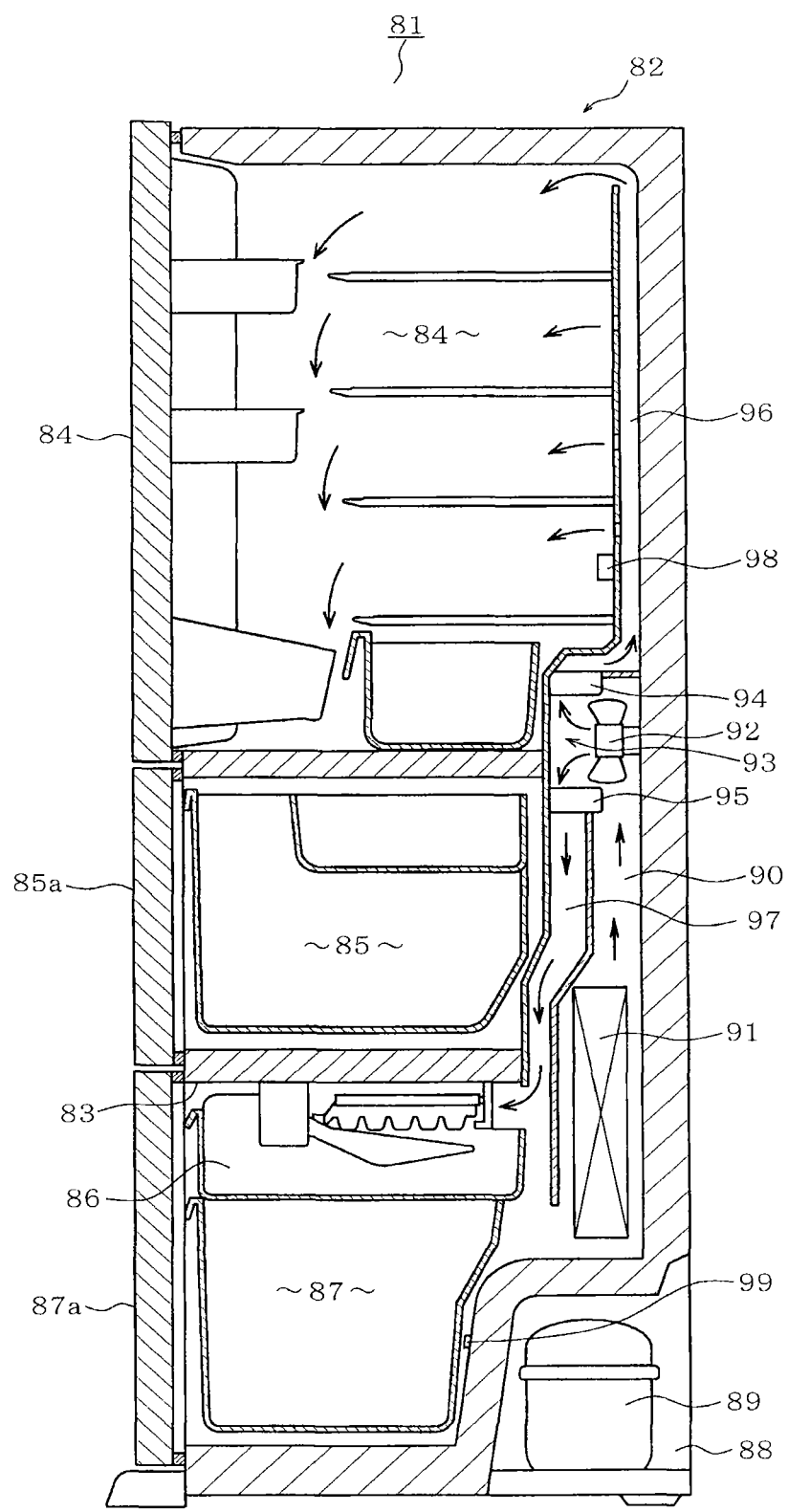
FIG. 19 is a longitudinally sectional side view of a refrigerator according to a sixth embodiment.
Figure 20:
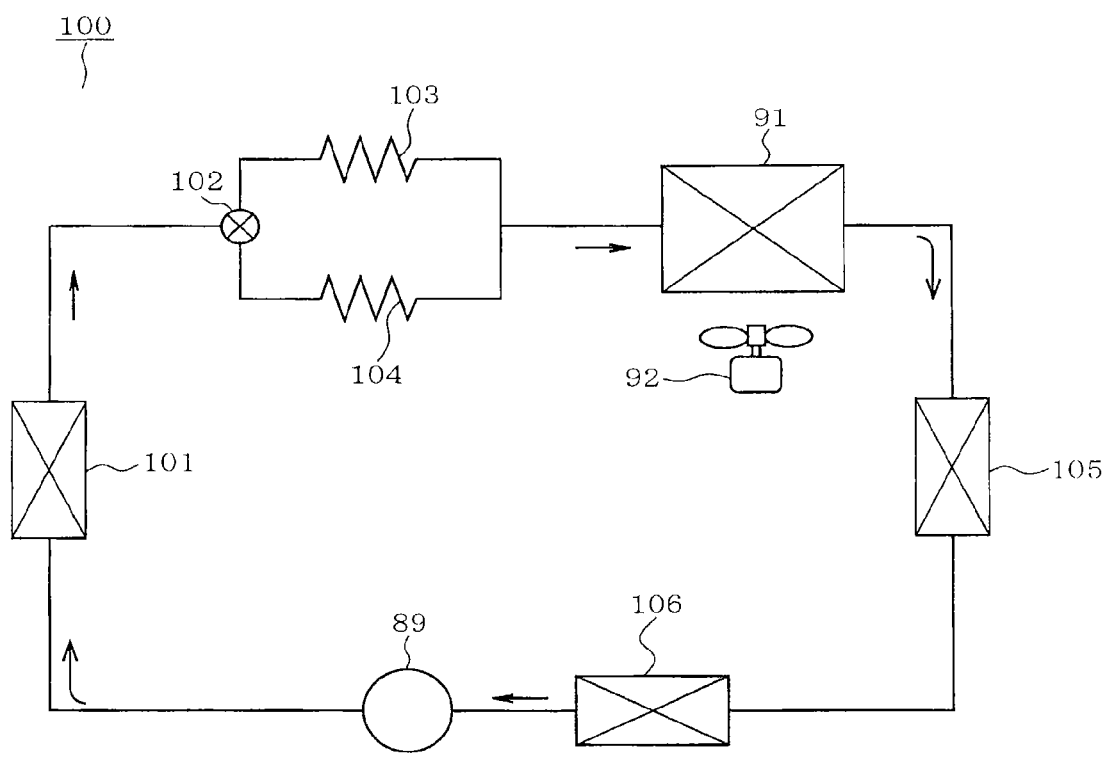
FIG. 20 schematically shows the heat pump system.
Figure 21:
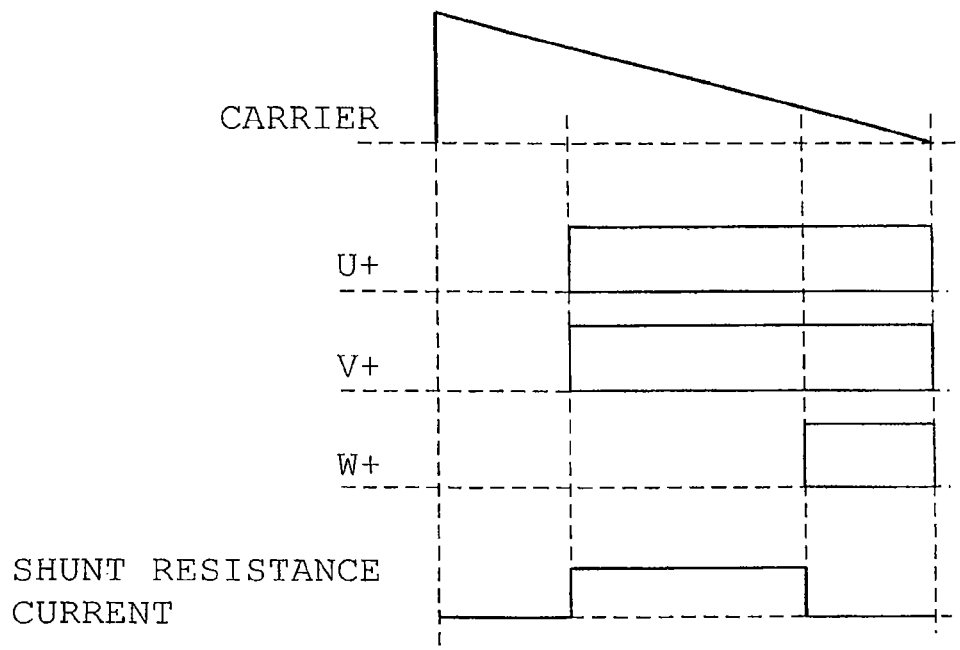
FIG. 21 shows a PWM carrier, three-phase PWM pulses and current of shunt resistance in the related art (No. 1)
Figure 22:
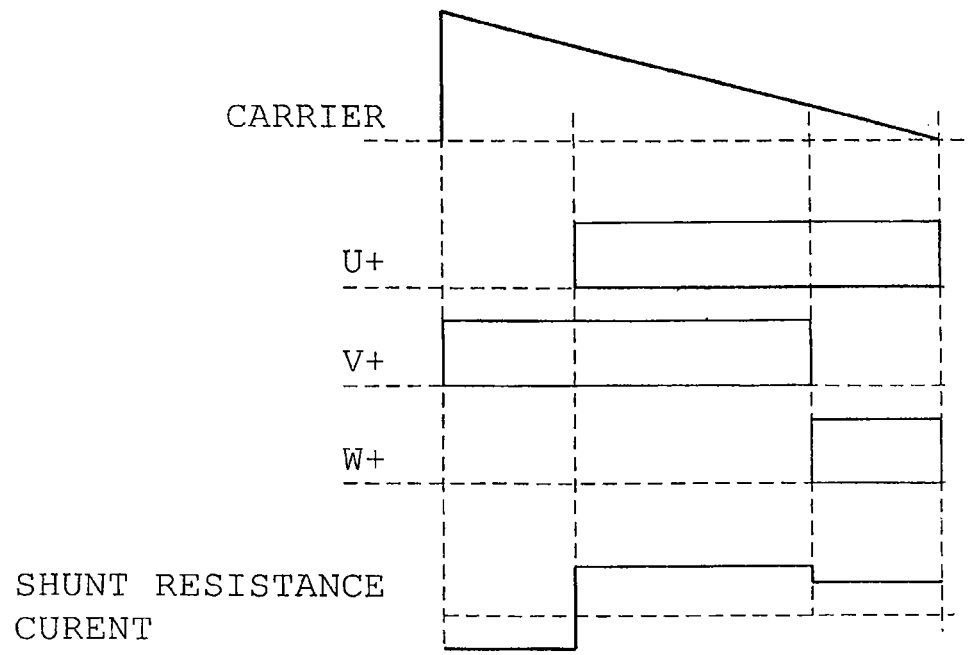
FIG. 22 is similar to FIG. 21 (No. 2)

FIGS. 19 and 20 show a sixth embodiment, in which the motor control device is applied to a compressor motor of a refrigerator. Referring to FIG. 19, a refrigerator 81 includes a cabinet 82 constructed of an outer box and an inner box and a heat insulator interposed between the outer and inner boxes. An interior of the cabinet 82 is divided by a heat insulation partitioner 83 into two spaces. More specifically, the interior of the cabinet 82 is divided into a refrigeration space (hereinafter "R space") located at an upper side of the refrigerator 81 and a freezing space (hereinafter "F space") located at a lower side of the refrigerator 81. The refrigerator 81 is provided with a refrigerating compartment 84, a vegetable compartment 85 and a freezing compartment 87 including an ice-making compartment 86. The R space includes the refrigerating compartment 84 and the vegetable compartment 85. The F space includes the ice-making compartment 86 and the freezing compartment 87.

A door 84a is hingedly mounted on the front of the refrigerating compartment 84 so as to be openable and closable. Pullout doors 85a and 87a are mounted in the vegetable compartment 85 and the freezing compartment 87 respectively. A component chamber 88 is provided at the rear side of the freezing compartment 87, that is, on the rear bottom of the cabinet 82. The component chamber 88 houses the compressor 89 and the like. A cooling space 90 formed by partitioning the R and F spaces is provided in the rear so as to extend from the lower part of the refrigerating compartment 84 to the upper part of the freezing compartment 87. The evaporator 91 is provided in a lower part of the cooling space 90. A cooling fan 92 is provided in an upper part of the cooling space 90.

A damper mechanism 93 is provided in front of the cooling fan 92 (at the blowoff side). The damper mechanism 93 includes a refrigerating damper (hereinafter, "R damper 94") opening and closing an air path to the R space side and a freezing damper (hereinafter, "F damper 95") opening and closing an air path to the F space side. A refrigerating duct (hereinafter, "R duct 96") is provided through which air flows upward from the R damper 94 to cool an atmosphere in the R space. A freezing duct (hereinafter, "F duct 97") is provided through which air flows downward from the F damper 95 to cool an atmosphere in the F space.

A refrigerating temperature sensor (hereinafter, "R sensor 98") is provided at the rear wall side in the refrigerating compartment 84 to detect an interior temperature in the refrigerating compartment 84. The R sensor 98 serves as a refrigerating temperature detecting unit. A freezing temperature sensor (hereinafter, "F sensor 99") is provided at the rear wall side in the freezing compartment 87 to detect an interior temperature in the freezing compartment 87.

The compressor 89, the evaporator 91 and the like compose a refrigeration cycle 100 as shown in FIG. 20. In the refrigeration cycle 100, a condenser 101, a switching valve 102, capillary tubes 103 and 104, the evaporator 91 an accumulator 105 and a suction pipe 106 are connected to one another sequentially in this order. The refrigeration cycle 100 on the whole forms a circulation path through which a refrigerant is circulated. Any known configuration can be employed for the refrigeration cycle 100. A single capillary tube may be provided, instead of the plural capillary tubes.

In the refrigeration cycle 100, the capillary tube 103 having a relatively smaller inner diameter is connected to one of outlets of the switching valve 102 connected to the condenser 101. The capillary tube 104 having a relatively larger inner diameter is connected to the other outlet of the switching valve 102. These capillary tubes 103 and 104 are united into one at the refrigerant outlet side to be connected to an inlet of the evaporator 91. The capillary tubes 103 and 104 configure a throttling mechanism.

The accumulator 105 and the suction pipe 106 are connected to the outlet side of the evaporator 91 and to an inlet side of the compressor 89. The compressor 89 is of a frequency-variable type in which an operating frequency is varied with the result that a rotational speed of the compressor 89 is varied. Basically, the cooling performance is increased by increasing the operating frequency, and the cooling performance is reduced by decreasing the operating frequency. The switching valve 102 comprises a three-way valve, for example.

The operation of the refrigeration cycle 100 will now be described. In the refrigeration cycle 100, the refrigerant is compressed by the compressor 89 thereby to be changed into a high-temperature high-pressure gas phase. On the other hand, heat is drawn from the refrigerant by the condenser 101 thereby to be changed into a liquid phase. The switching valve 102 performs a switching operation so that the liquid-phase refrigerant flows into the capillary tube 103 or 104, with the result that the refrigerant is decompressed by either capillary tube so as to become easy to vaporize. Subsequently, the refrigerant is vaporized by the evaporator 91 thereby to draw heat from air flowing in a surrounding area, namely, the cooling space 90.

The refrigerant having drawn heat from the surrounding atmosphere flows into the accumulator 106, so that the gas-liquid mixture refrigerant is divided into the gas phase refrigerant and the liquid phase refrigerant. Only the gas phase refrigerant returns through the suction pipe 106 to the compressor 89, which recompresses the refrigerant into the high-temperature high-pressure gas phase. As a result, air flowing in the cooling space 90 is cooled to be supplied by the cooling fan 92 into the R or F space. An electric motor employed in the compressor 89 is controlled by the motor control device of any one of the first to third embodiments.

According to the sixth embodiment, the motor of the compressor 89 of the refrigeration cycle 100 in the refrigerator 81 is controlled by the motor control device of any one embodiment. This can improve an operating efficiency of the refrigerator 81.

The invention should not be limited to the above-described embodiments but may be modified as follows. The time-points at which the current detection section 7 detects two-phase currents within the carrier period should not be based on the phase indicative of the minimum or maximum level of the carrier. The time-points may be set based on any phase of the carrier in a range in which the two-phase currents are detectable.

Further, the time-points at which the currents are detected should not correspond to the period of PWM carrier. For example, the current detection may be carried out in a period twofold or fourfold longer than the carrier period. Accordingly, the current detection timing signal supplied into the current detection section 7 should not be a carrier. For example, the current detection timing signal may be a pulse signal which has a predetermined period and is synchronous with the carrier.

The shunt resistance 4 may be disposed in the positive bus bar 2a. Further, the current detector should not be limited to the shunt resistance 4. For example, a current transformer (CT) or the like may be provided as the current detector.

The switching element should not be limited to the N-channel type MOSFET but may be a P-channel type MOSFET, an IGBT, a power transistor or a wide band gap semiconductor GaN, SiC or the like.

The above-described motor control devices may be applied to various types of washing machines with no drying function.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A motor control device configured to drive an electric motor via an inverter circuit which is configured to on-off control a plurality of switching elements connected into a three-phase bridge configuration, according to a predetermined PWM signal pattern thereby to convert direct current to three-phase alternating currents, the motor control device comprising:
   a current sensing element connected to the direct current side of the inverter circuit and configured to generate a signal according to a current value;
   a PWM signal generation unit configured to determine a rotor position based on phase currents of the motor and to generate three-phase PWM signal patterns so that the patterns follow the rotor position; and
   a current detection unit configured to detect phase currents of the motor based on the signal generated by the current sensing element and the PWM signal patterns,
   wherein the PWM signal generation unit is configured to generate the three-phase PWM signals in a manner such that the current detection unit is capable of detecting two-phase currents at two fixed time-points within a carrier period of the PWM signal;
   wherein regarding a first one of the three-phase PWM signals, a duty thereof is increased/decreased to both phase lag side and phase lead side with reference to any phase in the carrier period;
   wherein regarding another phase PWM signal, a duty thereof is increased/decreased to both phase lag side and phase lead side with reference to any phase away one half of the carrier period from the reference phase; and
   wherein regarding the other phase PWM signal, a duty thereof is increased/decreased to either phase lag side or phase lead side with reference to any phase in the carrier period.

2. The motor control device according to claim 1, wherein when the PWM signal generation unit is configured to use a triangular wave as the carrier and an amplitude of the triangular wave is increased in a first section and decreased in a second section, regarding two-phase PWM signals of the three-phase PWM signals, respective comparison conditions under which the triangular wave amplitude is compared with a PWM command in a magnitude relation are constant in the first and second sections and are in a reversed relation with each other phase;
   wherein regarding the other phase, a comparison condition for the first section differs from a comparison condition for the second section, and a twofold value of the duty is compared with a maximum value of the carrier amplitude;
   wherein when the twofold value of the duty is smaller than the maximum value, a duty of PWM signal generated and delivered in one of the first and second sections is set to the maximum value, and a duty of PWM signal generated and delivered in the other of the first and second sections is set to the twofold value of the duty; and
   wherein when the twofold value of the duty is larger than the maximum value, a duty of PWM signal generated and delivered in the one of the first and second sections is set to a value obtained by subtracting the twofold value of the duty from a twofold value of the maximum value, and a duty of PWM signal generated and delivered in the other of the first and second sections is set to the maximum value.

3. An air conditioner comprising:
   a compressor including an electric motor;
   an outdoor heat exchanger;
   a decompressor;
   an indoor heat exchanger;
   a current sensing element connected to a direct current side of an inverter circuit which is configured to on-off control a plurality of switching elements connected into a three-phase bridge configuration, according to a predetermined PWM signal pattern thereby to convert a direct current to a three-phase alternating current, the current sensing element generating a signal according to the current value;
   a PWM signal generation unit configured to determine a rotor position based on phase currents of the motor and to generate three-phase PWM signal patterns so that the patterns follow the rotor position; and
   a current detection unit configured to detect the phase currents of the motor based on the signal generated by the current sensing element and the PWM signal patterns,
   wherein the PWM signal generation unit is configured to generate the three-phase PWM signals in a manner such that the current detection unit is capable of detecting two-phase currents at two fixed time-points within a carrier period of the PWM signal;
   wherein regarding a first one of the three-phase PWM signals, a duty thereof is increased/decreased to both phase lag side and phase lead side with reference to any phase in the carrier period;

wherein regarding another phase PWM signal, a duty thereof is increased/decreased to both phase lag side and phase lead side with reference to any phase away one half of the carrier period from the reference phase;

wherein regarding the other phase PWM signal, a duty thereof is increased/decreased to either phase lag side or phase lead side with reference to any phase in the carrier period; and wherein the motor of the compressor is controlled by the inverter circuit.

4. A washing machine comprising:

an electric motor;

an inverter circuit configured to on-off control a plurality of switching elements connected into a three-phase bridge configuration, according to a predetermined PWM signal pattern thereby to convert a direct current to a three-phase alternating current and control the motor;

a current sensing element connected to the direct current side of the inverter circuit and configured to generate a signal according to a current value;

a PWM signal generation unit configured to determine a rotor position based on phase currents of the motor and to generate three-phase PWM signal patterns so that the patterns follow the rotor position; and a current detection unit configured to detect phase currents of the motor based on the signal generated by the current sensing element and the PWM signal patterns, wherein the PWM signal generation unit is configured to generate the three-phase PWM signals in a, manner such that the current detection unit is capable of detecting two-phase currents at two fixed time-points within a carrier period of the PWM signal;

wherein regarding a first one of the three-phase PWM signals, a duty thereof is increased/decreased to both phase lag side and phase lead side with reference to any phase in the carrier period;

wherein regarding another phase PWM signal, a duty thereof is increased/decreased to both phase lag side and phase lead side with reference to any phase away one half of the carrier period from the reference phase;

wherein regarding the other phase PWM signal, a duty thereof is increased/decreased to either phase lag side or phase lead side with reference to any phase in the carrier period; and wherein a washing operation is performed by a rotational driving force generated by the motor.

5. The washing machine according to claim 4, further comprising a heat pump system including a compressor, a condenser and an evaporator, wherein the inverter circuit is configured to drive the motor of the compressor, and the heat pump system is configured to perform a drying operation.

6. A refrigerator comprising:

a compressor including an electric motor;

a condenser;

an evaporator;

an inverter circuit configured to on-off control a plurality of switching elements connected into a three-phase bridge configuration, according to a predetermined PWM signal pattern thereby to convert a direct current to a three-phase alternating current and drive the motor;

a current sensing element connected to the direct current side of the inverter circuit and configured to generate a signal according to a current value;

a PWM signal generation unit configured to determine a rotor position based on phase currents of the motor and to generate three-phase PWM signal patterns so that the patterns follow the rotor position; and a current detection unit configured to detect phase currents of the motor based on the signal generated by the current sensing element and the PWM signal patterns, wherein the PWM signal generation unit is configured to generate the three-phase PWM signals in a manner such that the current detection unit is capable of detecting two-phase currents at two fixed time-points within a carrier period of the PWM signal;

wherein regarding a first one of the three-phase PWM signals, a duty thereof is increased/decreased to both phase lag side and phase lead side with reference to any phase in the carrier period;

wherein regarding another phase PWM signal, a duty thereof is increased/decreased to both phase lag side and phase lead side with reference to any phase away one half of the carrier period from the reference phase;

wherein regarding the other phase PWM signal, a duty thereof is increased/decreased to either phase lag side or phase lead side with reference to any phase in the carrier period; and wherein the motor of the compressor is controlled by the inverter circuit.

* * * * *